United States Patent [19]
Jones et al.

[11] Patent Number: 5,050,230
[45] Date of Patent: Sep. 17, 1991

[54] HYBRID RESIDUAL-BASED HIERARCHICAL STORAGE AND DISPLAY METHOD FOR HIGH RESOLUTION DIGITAL IMAGES IN A MULTIUSE ENVIRONMENT

[75] Inventors: Paul W. Jones, Churchville; Paul W. Melnychuck, West Henrietta, both of N.Y.

[73] Assignee: Eastman Kodak Company, Rochester, N.Y.

[21] Appl. No.: 576,029

[22] Filed: Sep. 27, 1990

Related U.S. Application Data

[62] Division of Ser. No. 442,872, Nov. 29, 1989.

[51] Int. Cl.$^5$ .............................................. G06K 9/00
[52] U.S. Cl. .................................... 382/56; 382/49; 358/133; 358/166; 358/262.1; 358/426
[58] Field of Search ................... 382/49, 56; 358/133, 358/166, 426, 262.1

[56] References Cited

U.S. PATENT DOCUMENTS 4,718,104  1/1988  Anderson .......................... 358/166

Primary Examiner—David K. Moore
Assistant Examiner—Daniel Santos
Attorney, Agent, or Firm—Edward Dugas

[57] ABSTRACT

An image processing method is described for the hierarchical storage and display of high resolution digital images in a multiuse environment. The method makes reduced resolution versions of the original image available for quick display on video monitors while providing access to the full resolution image for photographic quality hardcopies. This multiresolution method also provides for the efficient storage of this data via a hybrid coding scheme based on residuals. Several embodiments of this approach are described.

27 Claims, 23 Drawing Sheets

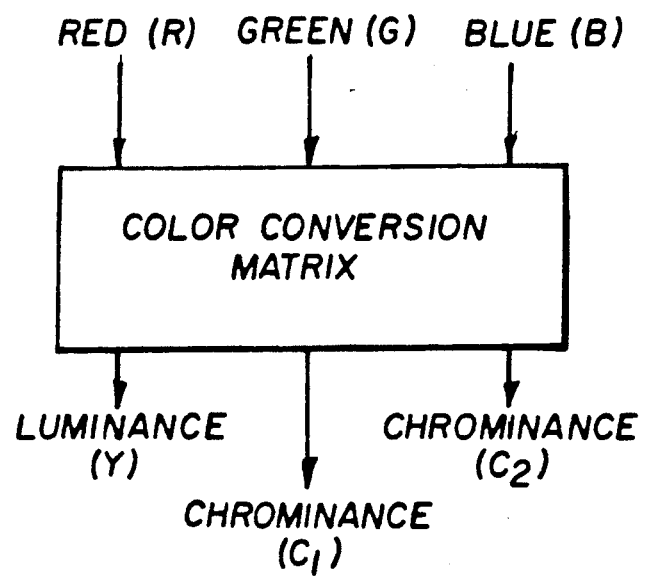
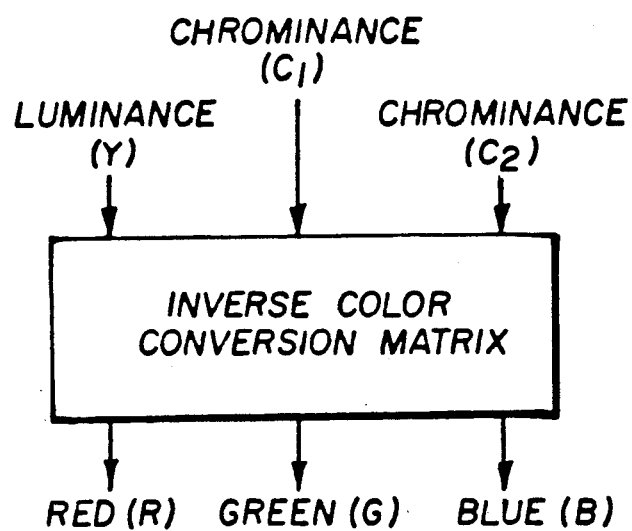
FIG. II

HYBRID RESIDUAL-BASED HIERARCHICAL STORAGE AND DISPLAY METHOD FOR HIGH RESOLUTION DIGITAL IMAGES IN A MULTIUSE ENVIRONMENT

This is a division, of application Ser. No. 442,872 filed Nov. 29, 1989.

TECHNICAL FIELD OF THE INVENTION

The present invention is related to a method of storing and displaying digital images and more particularly to a multiresolution method which makes available reduced resolution versions of original images for quick display and full resolution original images for making photographic quality hardcopies.

BACKGROUND OF THE INVENTION

An image processing method will be described for the efficient storage and display of high resolution digital images in a multiuse environment. A multiuse environment is one where the user has the option of selecting the type of display medium and the desired resolution on this medium. In particular, two types of display media are considered: video monitors and color hardcopies, through photographic, thermal imaging, or other means. Versions of an original digital image are made available at various resolutions to allow for the display of an HDTV quality image on video, an NTSC quality image with PAL/SECAM compatibility on video, and a sub-NTSC quality image on video, as well as a very high quality image on color hardcopy. However, it is important to note that the techniques described herein are not limited to these display media or resolutions.

The present invention uses a multiresolution or hierarchical structuring of the image data to allow for rapid access to the various image formats. It is also desirable to encode this hierarchical image data in an efficient manner so as to reduce the storage requirements on a digital storage media, e.g., optical discs or magnetic tape, and to allow for the rapid transfer of the image data from the storage media to the output device. Furthermore, it is desirable to minimize the hardware required to implement such a system. In particular, it is desirable to minimize the hardware required to access the lower resolution images along with its cost. Systems which use a hierarchical structuring of the image data are often termed progressive transmission since they allow image quality to be progressively refined; however, they are generally not designed specifically for a multiuse environment.

PRIOR ART

A number of hierarchical structures for image coding and/or progressive transmission have been described in the open technical literature and in various patents. Of particular relevance to the present invention are the following publications:

P. J. Burt and E. H. Adelson, "The Laplacian Pyramid as a Compact Image Code," IEEE Trans. Commun., COM-31, 532-540 (1983).

A. C. Luther, "Digital Video in the PC Environment," McGraw-Hill Book Company, New York, 81-84 (1989).

and the following patents:

U.S. Pat. No. 4,709,394, entitled "Multiplexed Real-Time Pyramid Signal Processing System", by Bessler et al., Nov. 24, 1987.

U.S. Pat. No. 4,674,125, entitled "Real-Time Hierarchical Pyramid Signal Processing Apparatus", by Carlson et al., Jun. 16, 1987.

U.S. Pat. No. 4,718,104, entitled "Filter-Subtract-Decimate Hierarchical Pyramid Signal Analyzing and Synthesizing Technique", by Anderson, Jan. 5, 1988.

U.S. Pat. No. 4,682,869, entitled "Image Processing System and Method", by Itoh et al., Jul. 28, 1987.

Referring to FIG. 1, the publication by Burt et al. teaches an encoding method for images termed the Laplacian pyramid, the Burt pyramid, or the residual pyramid. In this technique, the original image $G_0$ is lowpass filtered (LPF), and this lowpass image is subsampled to take advantage of its reduced bandwidth to provide the image $G_1$. This process of lowpass filtering and decimation is repeated three times to generate a hierarchical structure, or pyramid, of images ($G_0$, $G_1$, $G_2$, and $G_3$) of successively smaller dimensions. Although four resolution levels are shown, more or less can be used, depending on the application. Each lowpass image in this pyramid is then expanded to the dimensions of the next higher level by upsampling (inserting zeros) and filtering to form a prediction image for that level. This prediction image is subtracted from its corresponding lowpass image in a subtractor to generate difference, or residual, images $L_0$, $L_1$, and $L_2$. At the final level, the residual image is defined to be equivalent to the lowpass image, i.e., $L_3 = G_3$. The residual images corresponding to the levels of the lowpass pyramid form another pyramid which is termed the Laplacian, Burt, or residual pyramid. This technique is motivated by the fact that the residual images have a reduced variance and entropy compared to the original or lowpass images and may be quantized and entropy encoded to provide efficient storage of the data. The encoded residuals are denoted $\hat{L}_0$, $\hat{L}_1$, $\hat{L}_2$, and $\hat{L}_3$. Reconstruction is performed by interpolating the decoded lowpass image at the bottom of the lowpass pyramid and adding in the corresponding decoded residual to generate the next level in the lowpass pyramid. This process is iterated until the original image size is reached; the decoding process is illustrated in FIG. 2. A progressive improvement in reconstructed image quality and resolution can thus be obtained by displaying the reconstructed lowpass filtered image at each level of the pyramid, i.e., $\hat{G}_3$, $\hat{G}_2$, $\hat{G}_1$, and $\hat{G}_0$. Note that errors introduced in the encoding process are propagated from one level to the next higher level in the decoding process.

The patent to Anderson (U.S. Pat. No. 4,718,104) teaches a modification of the Burt pyramid scheme in which the lowpass filtered image is subtracted directly from the image at the previous level and then subsampled; it is not subsampled and interpolated prior to subtraction as in the Burt pyramid. This technique is termed the filter-subtract-decimate (FSD) pyramid. The primary advantage of this technique is a reduction in the hardware required to generate the pyramid.

The patents to Bessler et al. (U.S. Pat. No. 4,709,394) and Carlson et al. (U.S. Pat. No. 4,674,125) teach specific real-time implementations of the Burt pyramid or the FSD pyramid.

The patent to Itoh et al. (U.S. Pat. No. 4,682,869) essentially teaches the method of the Burt pyramid, albeit for the specific case of the multiuse scenario. The main advancement in the patent to Itoh et al. seems to be specific methods for forming the prediction image used to generate the residual image and methods for encoding the residual, particularly for the case of binary images.

There are two primary limitations in using the techniques described in the prior art for a multiuse environment:

To reconstruct the lowpass signal at a given resolution level, all lower resolution images must be reconstructed first. This requires substantial hardware and processing time.

The techniques require quantization of the hierarchical image data to achieve significant compression. If the hierarchy contains many levels of resolution (as is required in the multiuse scenario), significant degradation may occur at the highest resolution level owing to propagation of quantization noise. Therefore, the prior art techniques are undesirable.

In contrast, the to be disclosed system fills the need for very high quality at the highest resolution level (for hardcopies of photographic quality) while providing efficient access to images at lower resolution levels.

SUMMARY OF THE INVENTION

The present invention overcomes these limitations by using a hybrid scheme which permits fast reconstruction of the lower resolution images with relatively simple hardware while yielding very high reconstruction quality at the highest resolution level. Furthermore, the image hierarchy can still be encoded efficiently, i.e., at a low bit rate, and is stored in such a manner that it can be accessed efficiently when being read from the storage medium. In essence, the proposed technique uses the residual pyramid to provide efficient storage of the higher resolution levels combined with other techniques for the lower resolution levels to satisfy the system requirement of fast access to these lower levels. It is assumed the image data is encoded using an entropy coding technique such as Huffman coding or Q-coding, although it may be advantageous in some cases to store the data without entropy coding to provide immediate access to these records. The data may also be quantized prior to encoding, or it may be encoded in a lossless manner, i.e., without quantization. To some extent, the present method effectively decouples the lower resolution images from the higher resolution images to prevent the propagation of quantization noise from the lower levels and to provide quick access to the lower resolution images.

From the foregoing, it can be seen that it is a primary object of the present invention to provide a method for storing and displaying digital images with selectable multiresolution levels.

It is another object of the present invention to provide a hierarchical storage and display method which minimizes hardware requirements, storage space, and cost.

The above and other objects of the present invention will become more apparent when taken in conjunction with the following description and drawings wherein like characters indicate like parts and which drawings form a part of the present description.

BRIEF DESCRIPTION OF THE DRAWINGS

FIG. 11 is a block diagram illustrating the color conversion method.

DESCRIPTION OF THE PREFERRED EMBODIMENTS

Figure 1:
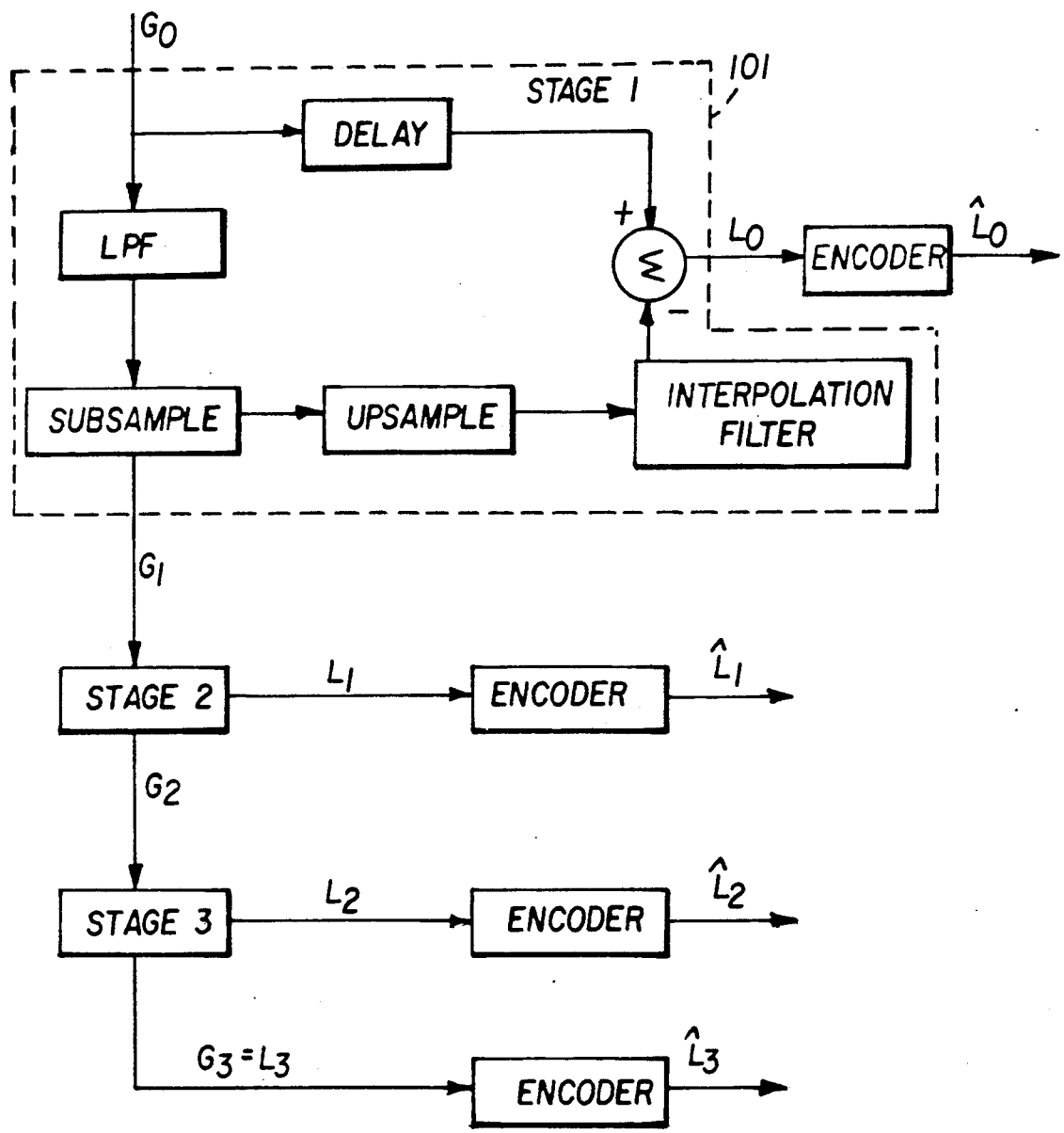
FIG. 1 is a block diagram illustrating a prior art pyramid residual image encoder method.
Figure 2:
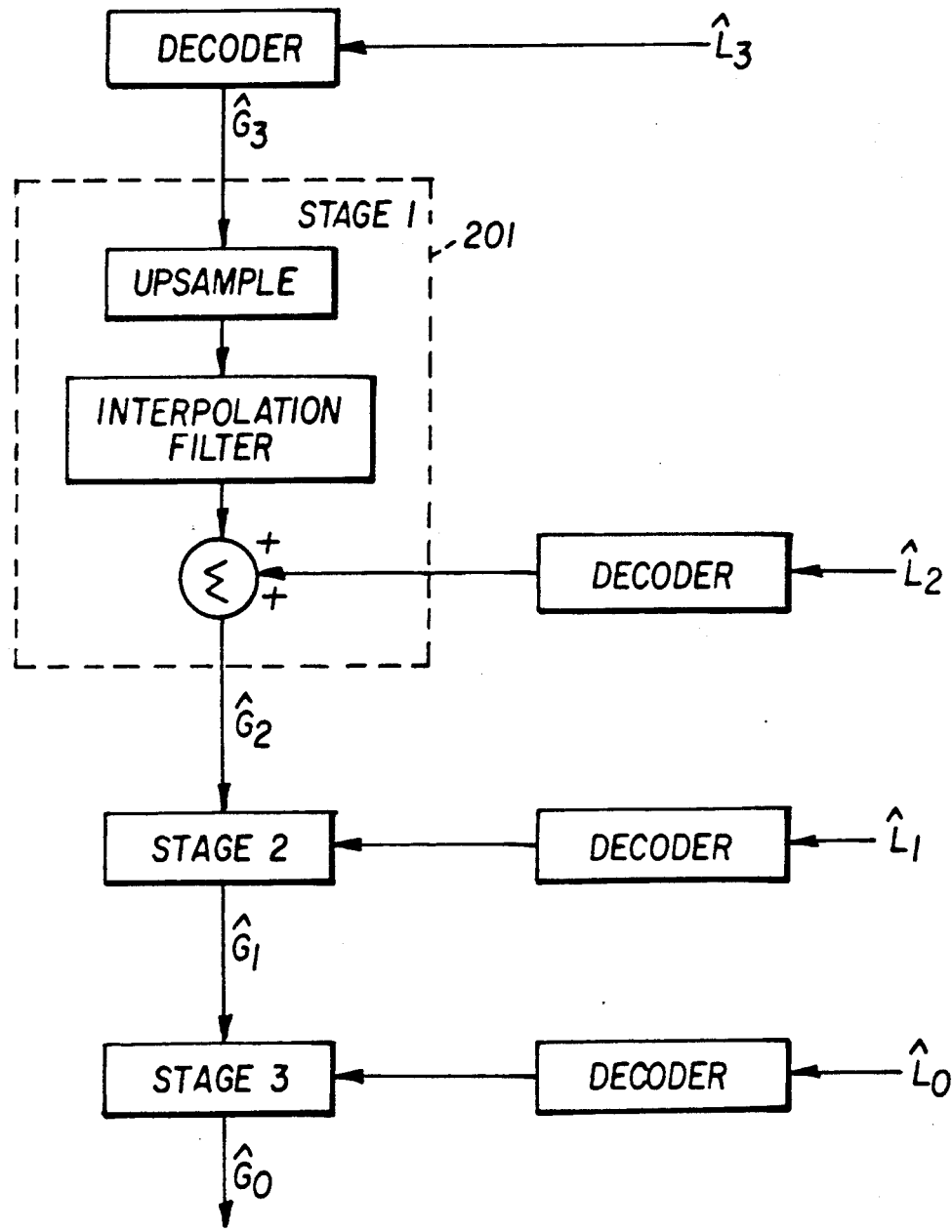
FIG. 2 is a block diagram illustrating a prior art pyramid residual image decoder method.
Figure 3:
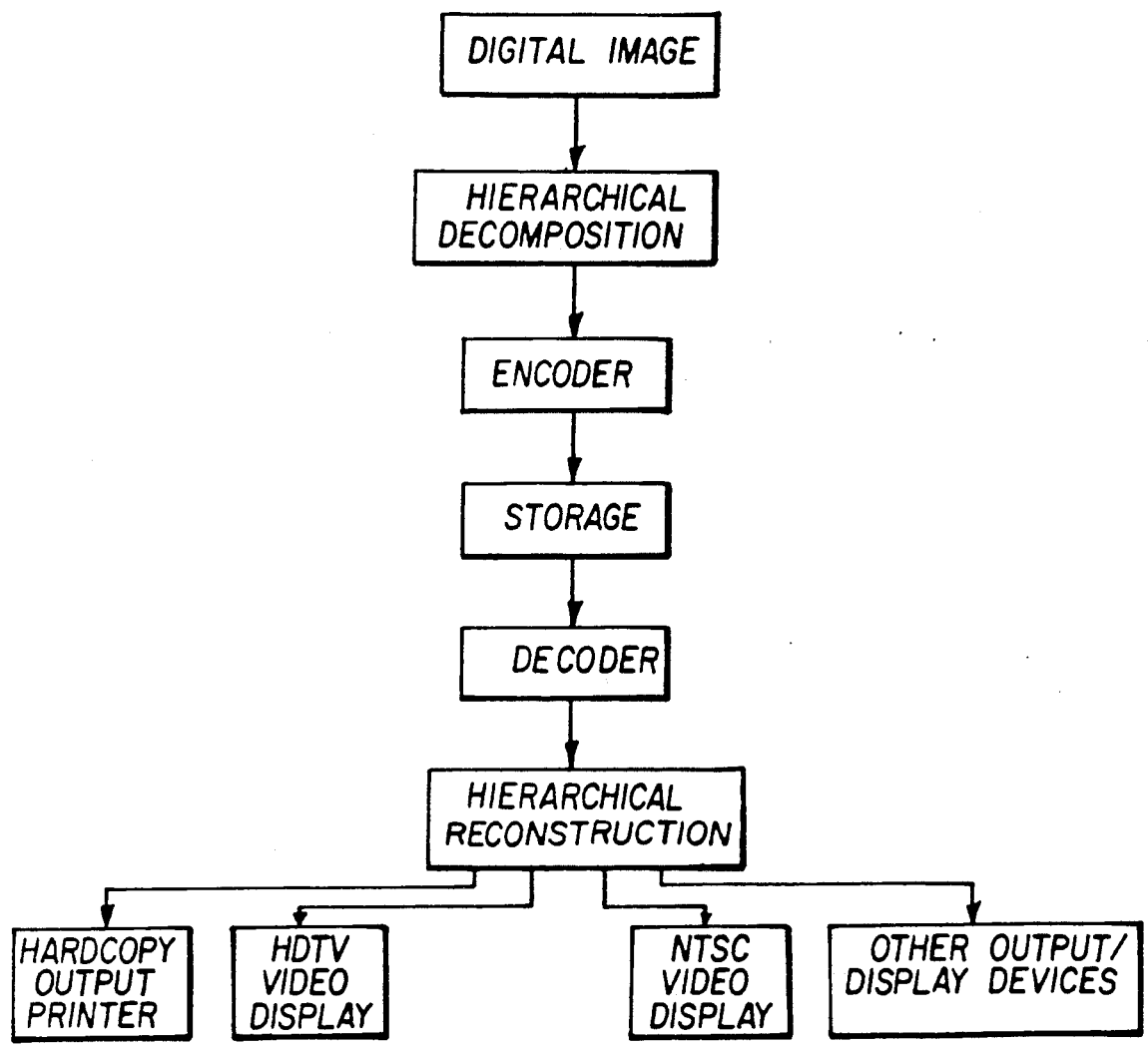
FIG. 3 is a block diagram illustrating the hierarchical storage and display method.

In the following description of the preferred embodiments, it will be assumed that the highest resolution image is composed of 2048×3072 pixels and that this resolution is adequate to produce photographic quality originals on an appropriate digital output device. It is also assumed that the lowest resolution level is composed of 256×384 pixels and that this resolution is adequate for preliminary, but relatively low quality, display on an NTSC-quality video monitor. The other resolution levels are 512×768 pixels for high quality display on an NTSC-quality video monitor and 1024×1536 for high quality display on proposed HDTV video monitors. These resolutions will be denoted as 256 (for 256×384), 512 (for 512×768), 1K (for 1024×1536), and 2K (for 2048×3072) for convenience. The basic diagram for the hierarchical storage and display method is illustrated in FIG. 3. However, it is important to note that the invention is not limited to these resolutions or output devices. Indeed, many variations with other resolutions and output devices may be used, and these resolutions may not necessarily be related to each other by some power of two as the previously described resolutions are (assuming some form of interpolation is available.) In addition, the number of resolution levels and the type of decomposition at each level may vary to some extent, yet still be consistent with the described embodiments. The embodiments are first described in general terms for a single channel image, i.e., one-color or luminance image, and then further embodiments are described for the case of three-channel color images.

1. Residual Pyramid with Progressive Partitioning

Figure 4:
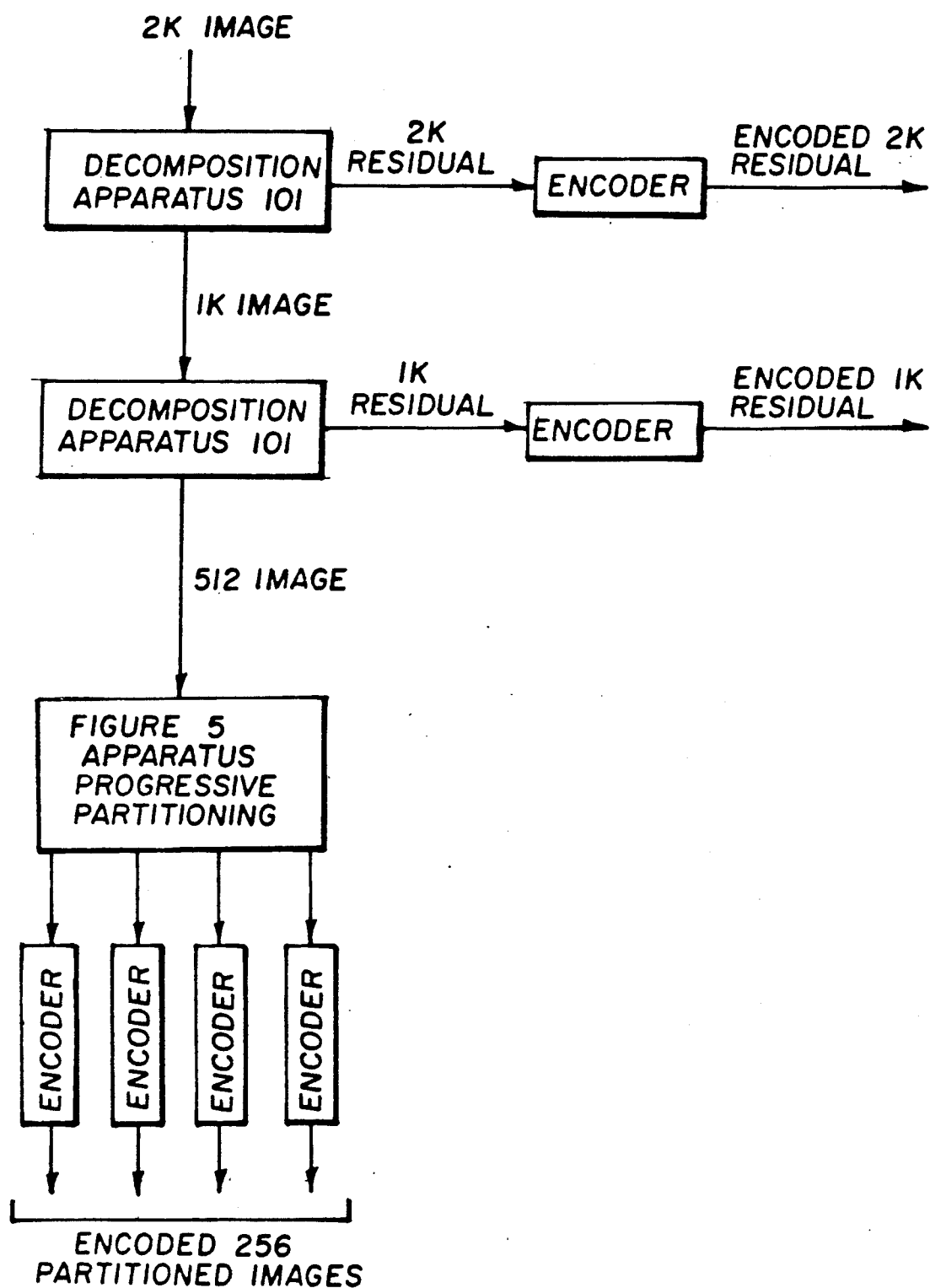
FIG. 4 is a block diagram illustrating the decomposition and encoder portion of a first preferred embodiment of the present invention using a residual pyramid with progressive partitioning.
Figure 5:
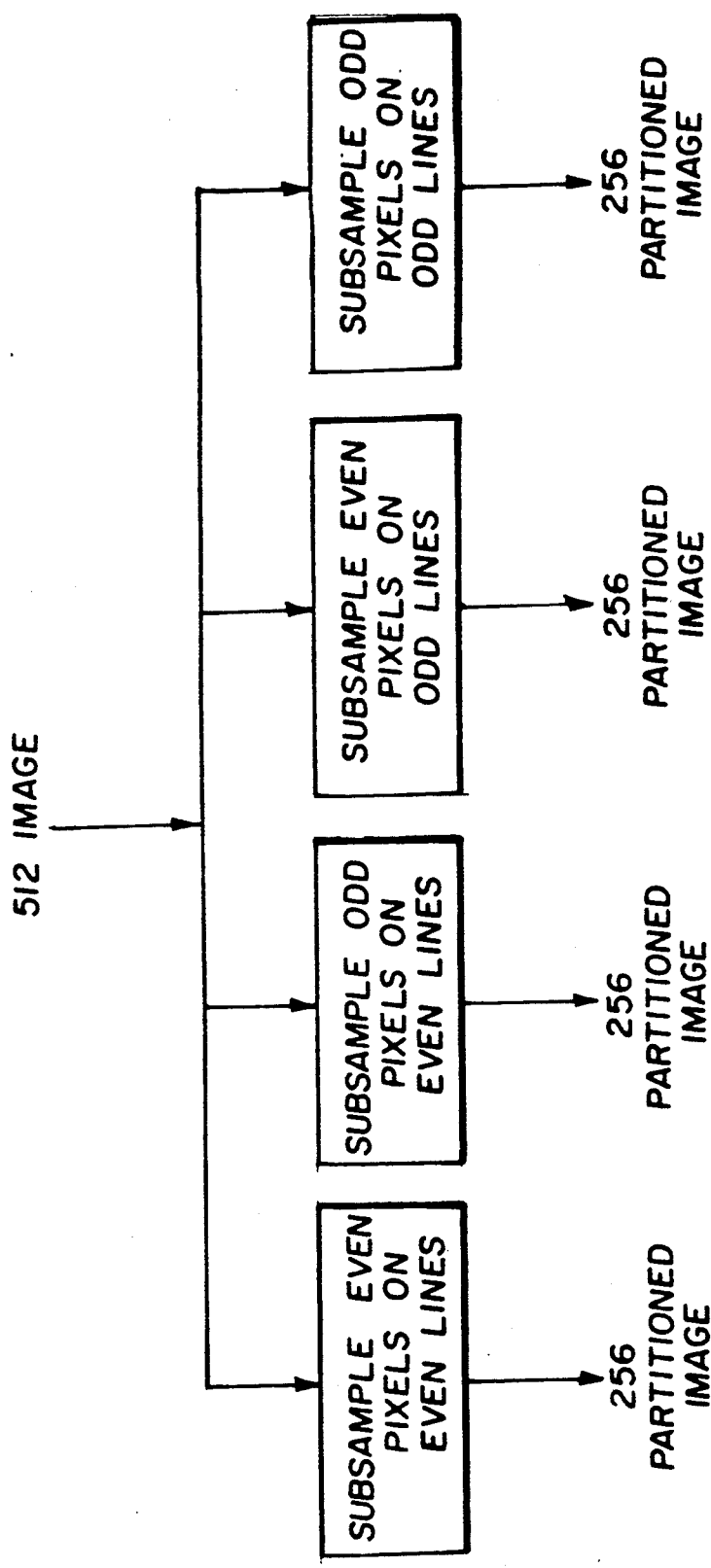
FIG. 5 is a block diagram illustrating the progressive partitioning of a full resolution image into lesser resolution images.
Figure 6:
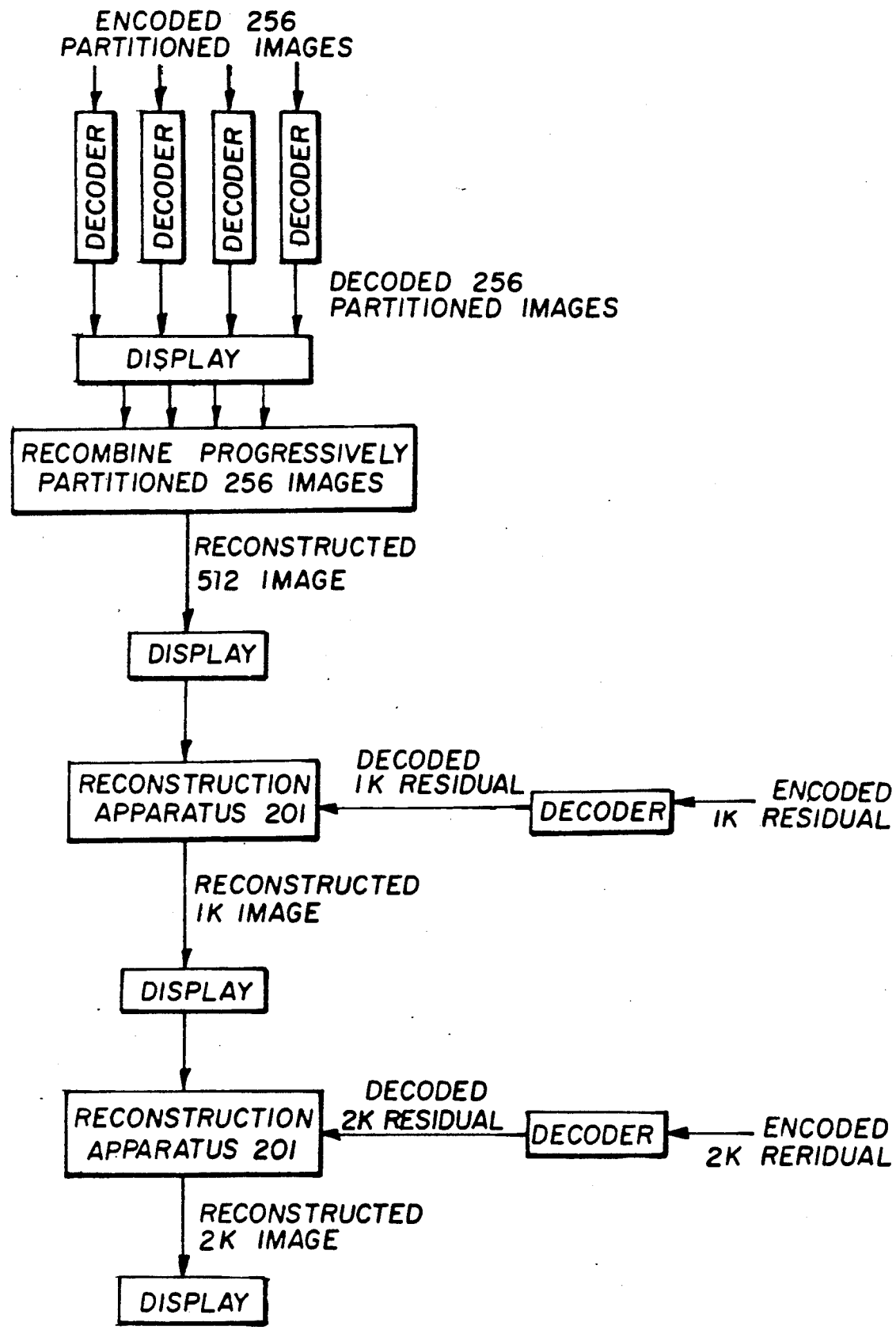
FIG. 6 is a block diagram illustrating the decoder and reconstruction portion of a first preferred embodiment of the present invention using a residual pyramid with progressive partitioning.

In the first embodiment, illustrated in FIG. 4, the 2K image is decomposed into a residual pyramid consisting of a 512 base image, a 1K residual, and a 2K residual. To further decompose the 512 image, a separate technique is used whereby the 512 image is decomposed into four 256 images by subsampling the original 512 image in a staggered fashion as shown in FIG. 5. We term this technique progressive partitioning. The information to be stored is then composed of the four 256 partitioned images (which can be used to reconstruct the 512 image) and the 1K and 2K residuals. The residuals can then be used to reconstruct the 1K image and the 2K image. The reconstruction process is illustrated in FIG. 6. This technique is motivated by the following:

The 256 partitioned images can be created and displayed without any special/additional hardware.

The 512 image can be built up and displayed in a progressive manner without any special hardware using one or more of the 256 partitioned images. Also, since the 256 images are direct subsamples of the 512 image, the reconstruction of the 512 image can be done without the addition of any quantization noise in excess of what it originally contained.

The lowest resolution image is effectively decoupled from the higher resolution images to minimize the propagation of quantization noise to the higher levels.

This technique is efficient in terms of nonredundant storage of the image data, and the use of the residuals still allows for significant image compression.

2. Residual Coding with Direct Access to 256 and 512 Images

Figure 7:
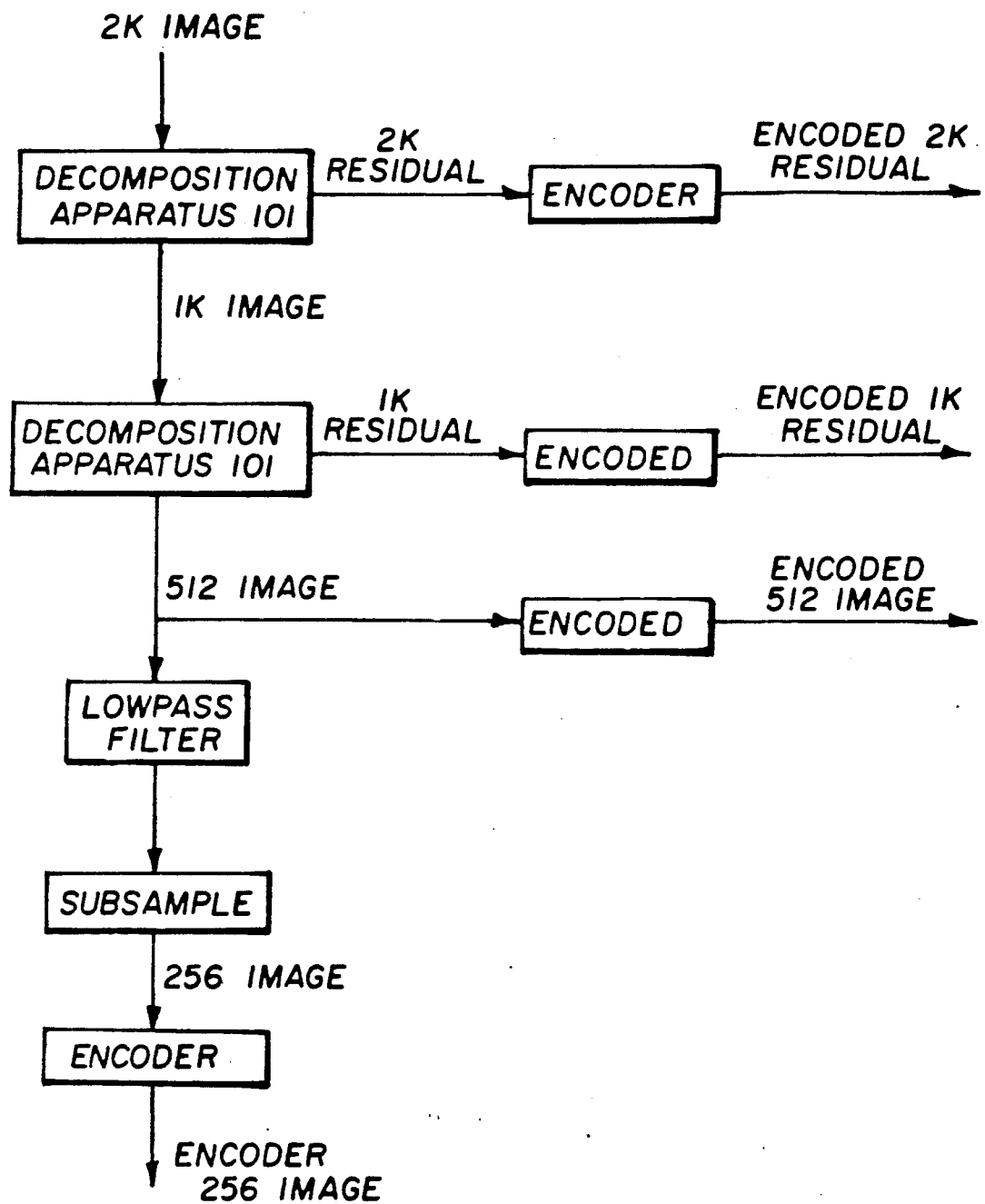
FIG. 7 is a block diagram illustrating the decomposition and encoder portion of a second preferred embodiment of the present invention using a residual pyramid with direct access to multiresolution images.
Figure 8:
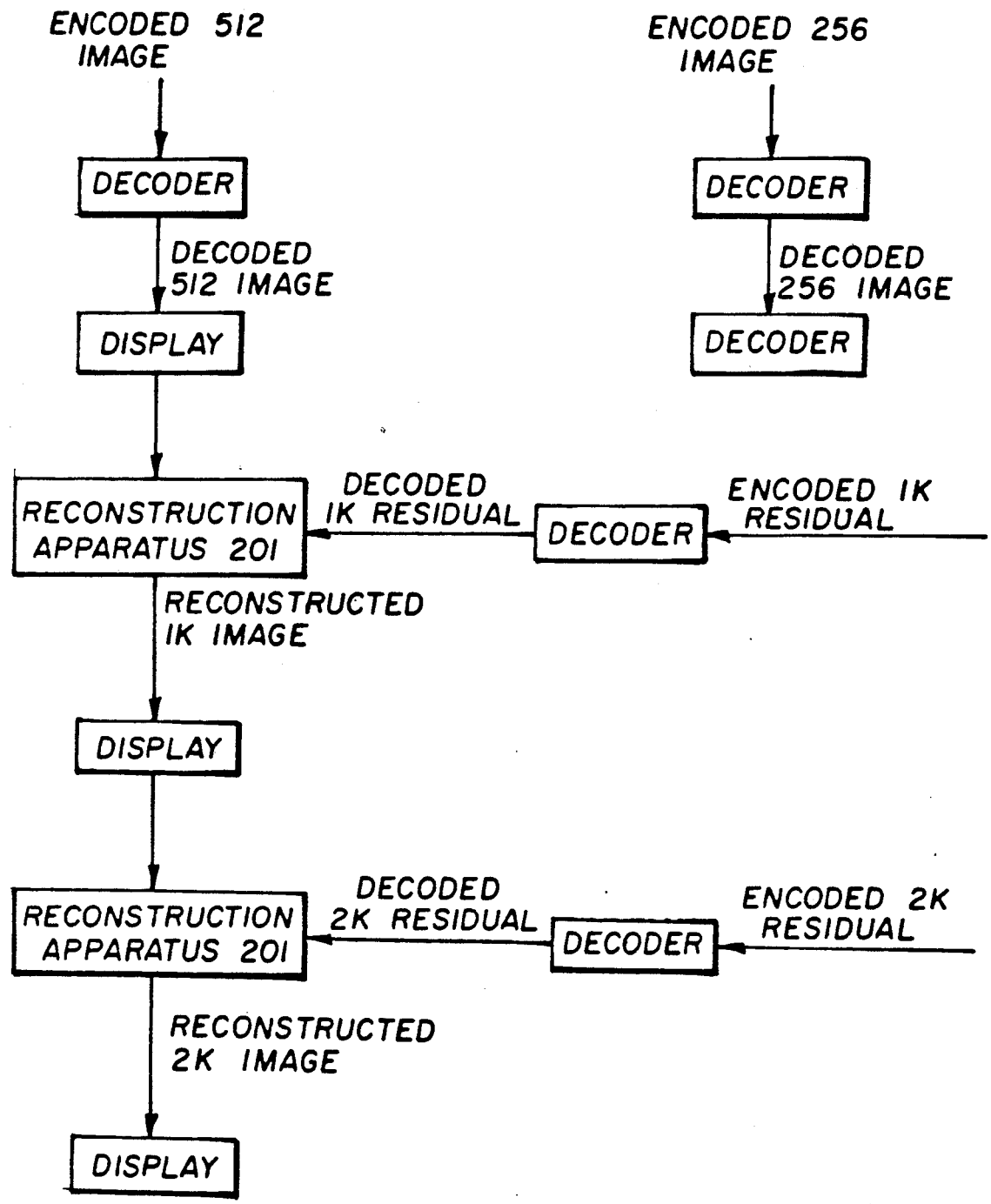
FIG. 8 is a block diagram illustrating the decoder and reconstruction portion of a second preferred embodiment of the present invention using a residual pyramid with direct access to multiresolution images.

In the second embodiment, direct access is provided to both the 256 and 512 images, i.e., no progressive partitioning is used. In this approach, the 2K image is decomposed into a residual pyramid consisting of a 512 base image, a 1K residual, and a 2K residual. The 512 image is not decomposed into 256 images using progressive partitioning, but is merely prefiltered and subsampled to create a 256 image suitable for display. This process is shown in FIG. 7. The information to be stored consists of the 256 image, the 512 image, the 1K residual, and the 2K residual. The residuals can be used to reconstruct the 1K and 2K images. The reconstruction process is illustrated in FIG. 8. The advantages of this approach are:

The 256 and 512 images are directly available for display with no special hardware or filtering operations, while the use of residuals for the higher resolution images still allows for significant image compression.

The lower resolution images are more completely decoupled from the 2K image so that very high fidelity can be achieved at the 2K level.

The 512 image is prefiltered prior to subsampling which allows for higher quality in the 256 image as compared to progressive partitioning. The tradeoff with this approach is that additional storage is required since the 256 image is redundant to the 512 image.

3. Residual Pyramid with CD-I Compatibility

Figure 9:
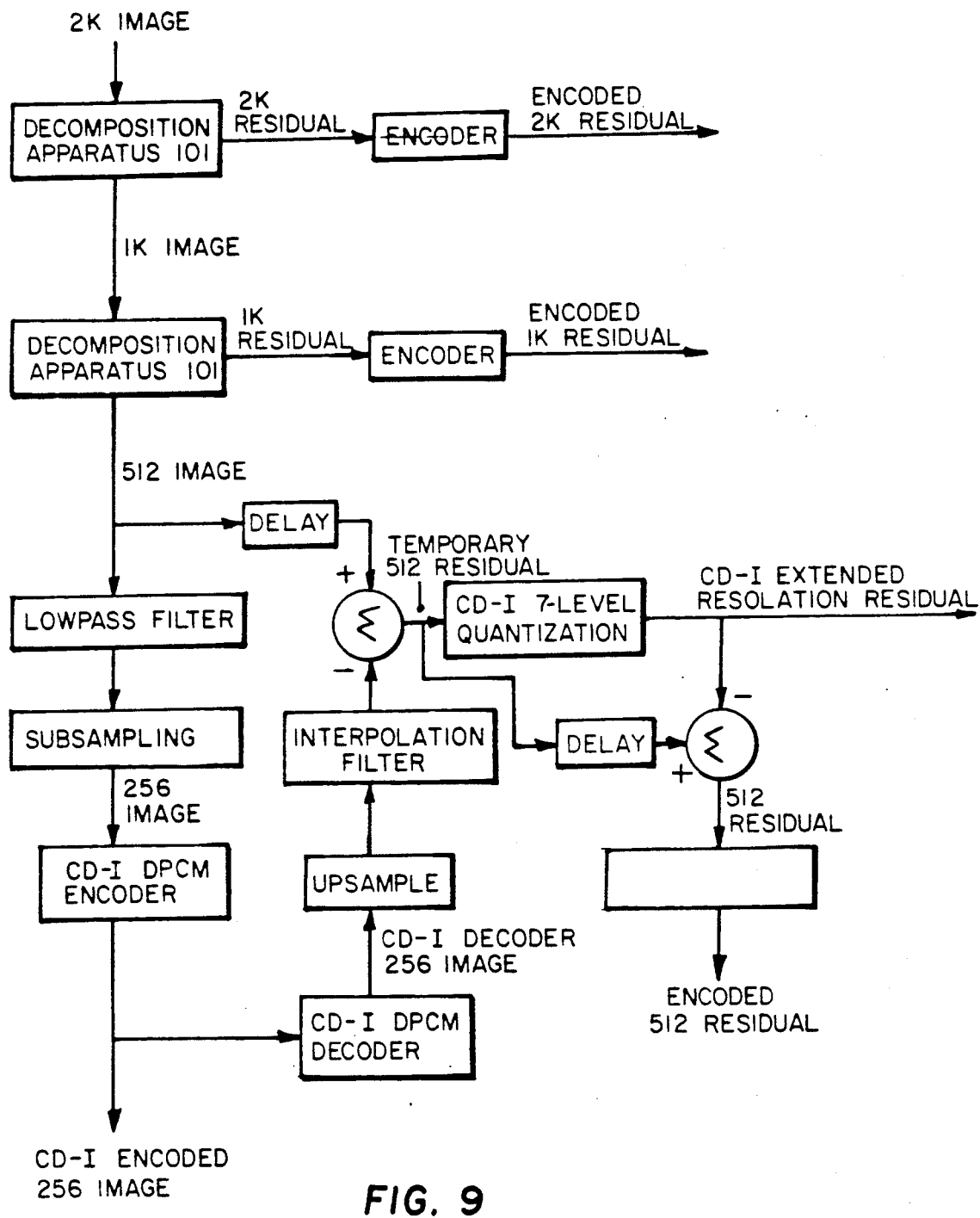
FIG. 9 is a block diagram illustrating the decomposition and encoder portion of a third preferred embodiment of the present invention using a residual pyramid with CD-I compatibility.
Figure 10:
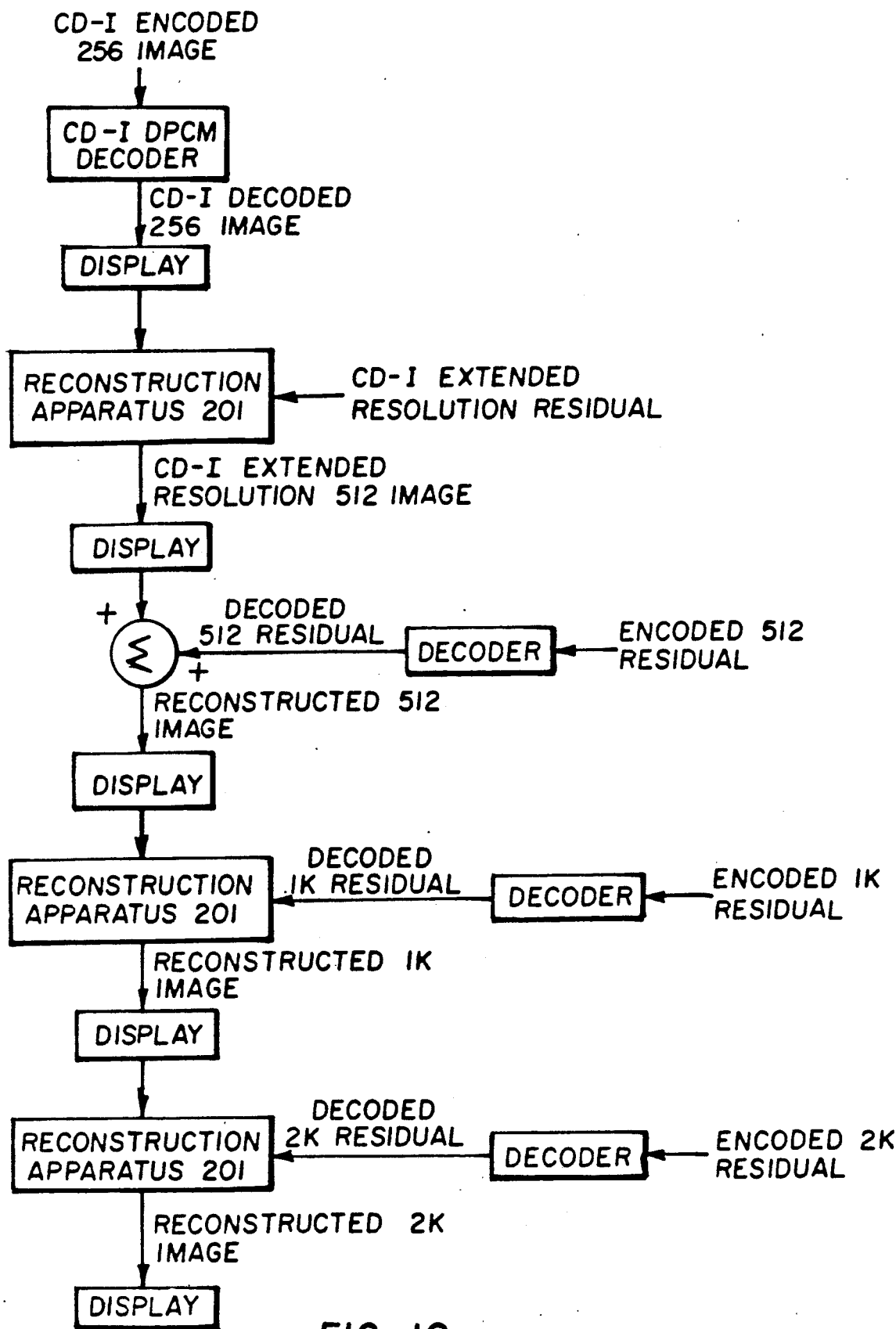
FIG. 10 is a block diagram illustrating the decoder and reconstruction portion of a third preferred embodiment of the present invention using a residual pyramid with CD-I compatibility.

Referring to FIG. 9, the third embodiment uses a residual pyramid, but also incorporates the Philips CD-I (Compact Disc-Interactive) real-time video data format (as referenced in the publication by A. C. Luther in Prior Art) at the 256 and 512 levels in order to provide compatibility with this format. The 2K image is decomposed into a residual pyramid consisting of a 512 image, a 1K residual, and a 2K residual. The 512 image is then lowpass filtered and subsampled to form a 256 base image as in the previous embodiment. However, the technique differs in the encoding of the 256 base image and the 512 image in order to be compatible with the CD-I format. The 256 base image is encoded using the CD-I encoding scheme, namely, differential pulse code modulation (DPCM), rather than an entropy coding technique as was used in the other embodiments. This 256 image is then decoded with the CD-I decoder and interpolated to the dimensions of the 512 image, forming a 512 prediction image. A 512 residual image is formed by subtracting this prediction image from the 512 image. The 512 residual image is first encoded using the CD-I "extended resolution" format which is a 7-bit quantization of the residual. A secondary 512 residual is then formed as the difference between the original 512 residual and the 7-bit CD-I residual. The information to be stored thus consists of the CD-I 256 base image, the CD-I 512 extended resolution residual, the 512 secondary residual, the 1K residual, and the 2K residual images. The reconstruction decoding process is illustrated in FIG. 10. The advantage of this technique is the compatibility with the CD-I format at the 256 and 512 levels.

Of substantial interest is how the described embodiments may be extended to handle images that are composed of more than one-channel, specifically, three-channel color images. The direct approach is to encode each channel in the same manner, using one of the described embodiments. However, it is possible with some color spaces to achieve a substantial savings in storage requirements by subsampling the data to exploit the reduced bandwidth of the human visual system in certain color channels. Thus, it may be advantageous to encode each color channel in a different manner. In describing the apparatus used to encode such color signals, we assume that the three-color signal is comprised of a luminance signal, Y, and two chrominance signals, $C_1$ and $C_2$. These signals may be acquired directly from devices designed to output such color signals, or they may be generated by converting red (R), green (G), and blue (B) color signals supplied by a color television camera. The color conversion to Y, $C_1$, and $C_2$ is a linear transformation of the R, G, and B signals, and hence an inverse color conversion from Y, $C_1$, and $C_2$ to R, G, and B is also a linear transformation. The color conversion apparatus is illustrated in FIG. 11. An example of the luminance/chrominance conversion from R, G, and B signals is the NTSC (National Television Standards Committee) YIQ conversion given by the following equations.

$$Y = 0.299R + 0.587G + 0.114B$$

$$I = C_1 = 0.596R - 0.273G - 0.322B$$

$$Q = C_2 = 0.212R - 0.522G + 0.315B$$

The chrominance signals $C_1$ and $C_2$ may also be simple color difference signals such as R−Y and B−Y, for example. We define the color conversion to be of these forms or their like.

It is well-known that the human visual system has a reduced bandwidth for the chrominance signals as compared to the luminance signal, and thus a substantial savings in storage can be achieved by subsampling the chrominance signals, $C_1$ and $C_2$ relative to the luminance signal Y. Typical subsampling factors for $C_1$ and $C_2$ relative to Y at a given resolution level are 2 or 4. It may be advantageous to prefilter the chrominance signals prior to subsampling to reduce aliasing artifacts. In the following discussion and drawings, it is assumed that the luminance signal is encoded using one of the embodiments described previously. Also, the embodiments are shown for only one chrominance signal, and it is understood that $C_1$ and $C_2$ may be encoded using the same method or possibly differing methods to take advantage of each signal's specific characteristics. To provide compatibility with the Philips CD-I format, any of the preferred embodiments for chrominance signals may be modified by using DPCM encoding and decoding of the 256 base image.

Figure 12:
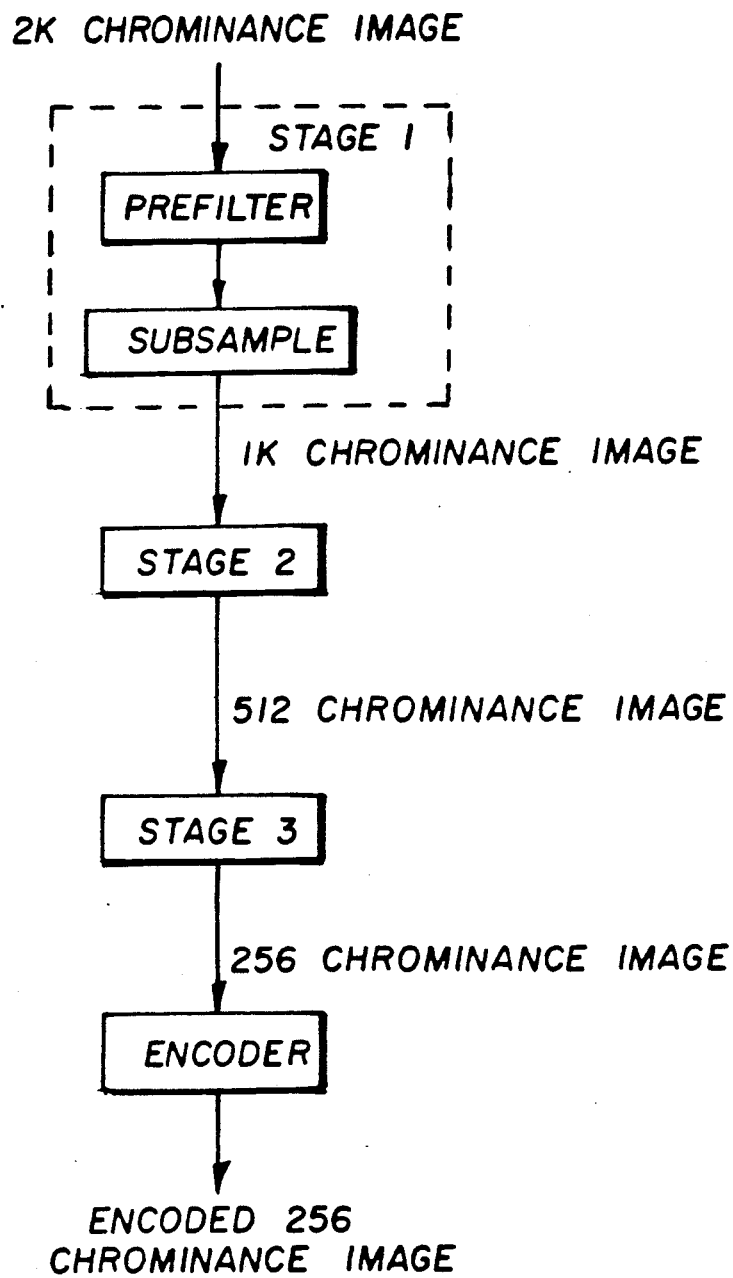
FIG. 12 is a block diagram illustrating the decomposition and encoder portion of a first preferred embodiment of the present invention for chrominance signals.
Figure 13:
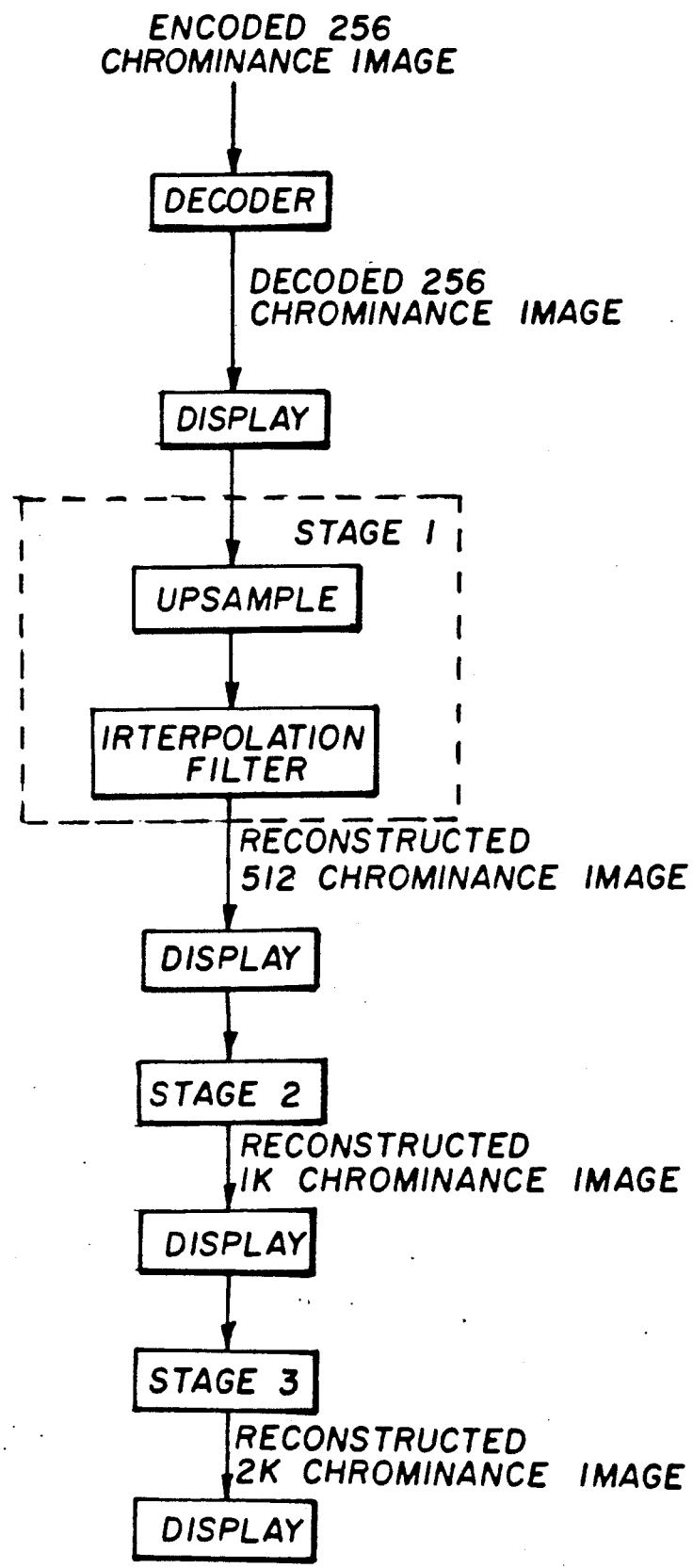
FIG. 13 is a block diagram illustrating the decoder and reconstruction portion of a first preferred embodiment of the present invention for chrominance signals.

In a first embodiment for chrominance signals, the apparatus of FIG. 12 is used for decomposition and encoding. The chrominance information to be stored consists solely of a 256 base image for each chrominance signal. To reconstruct images at the various resolution levels, the apparatus of FIG. 13 is used. This embodiment has the advantage of requiring a minimal amount of storage space for the chrominance signals and requiring only an interpolation process to generate the chrominance signals at higher resolution levels. A limitation of this method is that chrominance errors may be introduced at the higher resolution levels.

Figure 14:
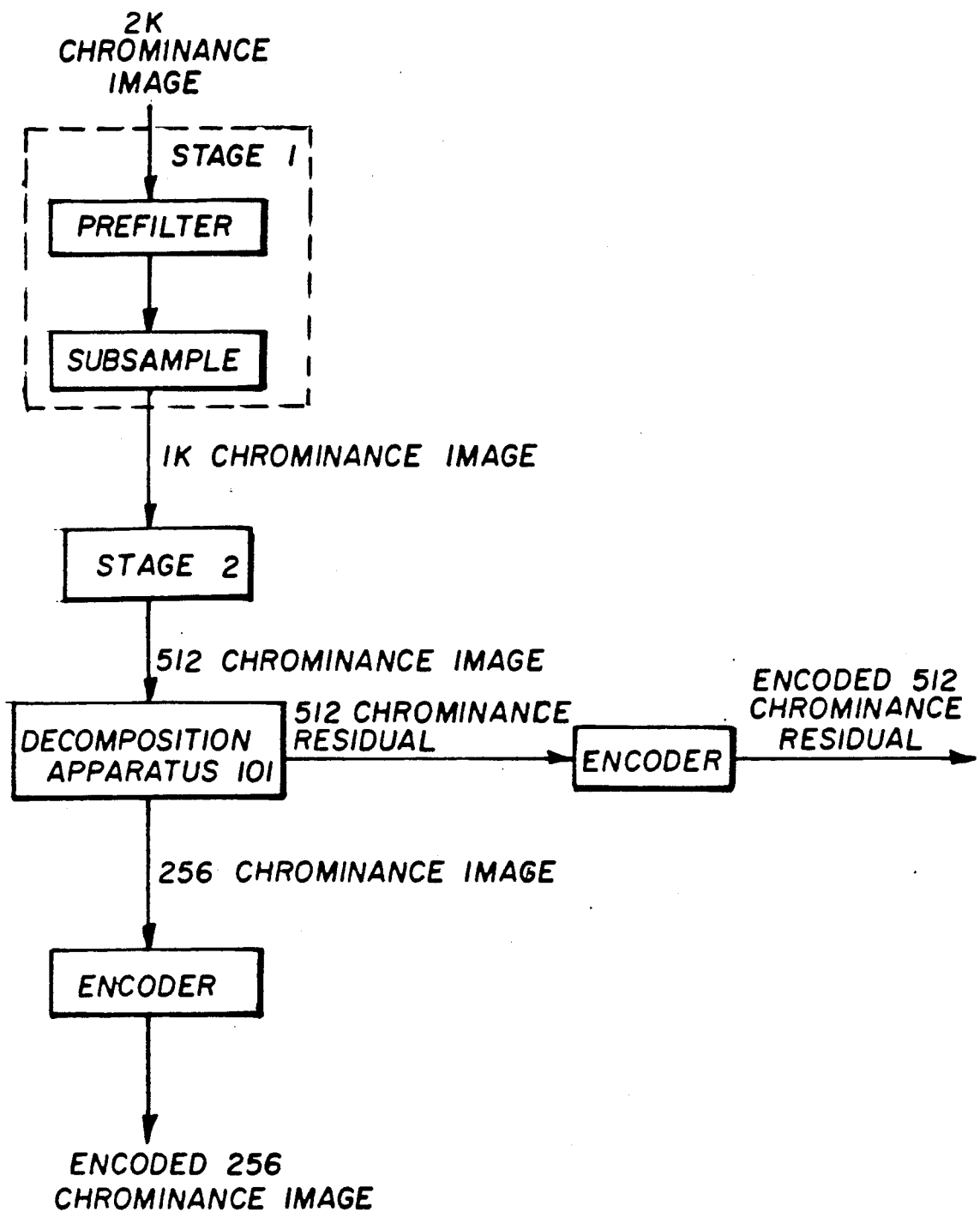
FIG. 14 is a block diagram illustrating the decomposition and encoder portion of a second preferred embodiment of the present invention for chrominance signals.
Figure 15:
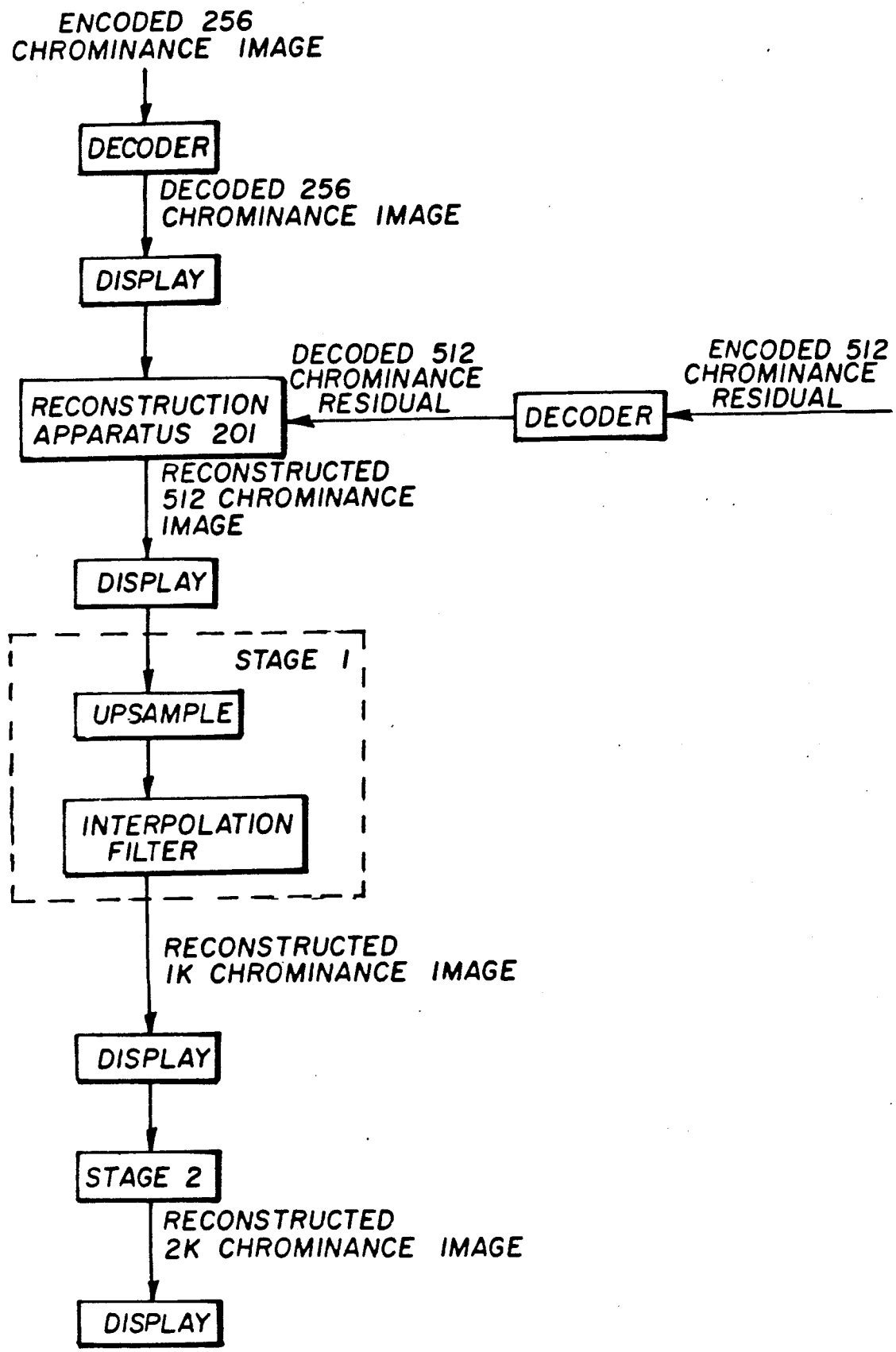
FIG. 15 is a block diagram illustrating the decoder and reconstruction portion of a second preferred embodiment of the present invention for chrominance signals.

In a second embodiment for chrominance signals, the apparatus of FIG. 14 is used for decomposition and encoding. The chrominance information to be stored consists of a 256 base image and a 512 residual. Images are reconstructed using the apparatus of FIG. 15. This method improves reconstructed quality at the 512, 1K, and 2K levels compared to the first embodiment while still providing significant compression of the chrominance signals.

Figure 16:
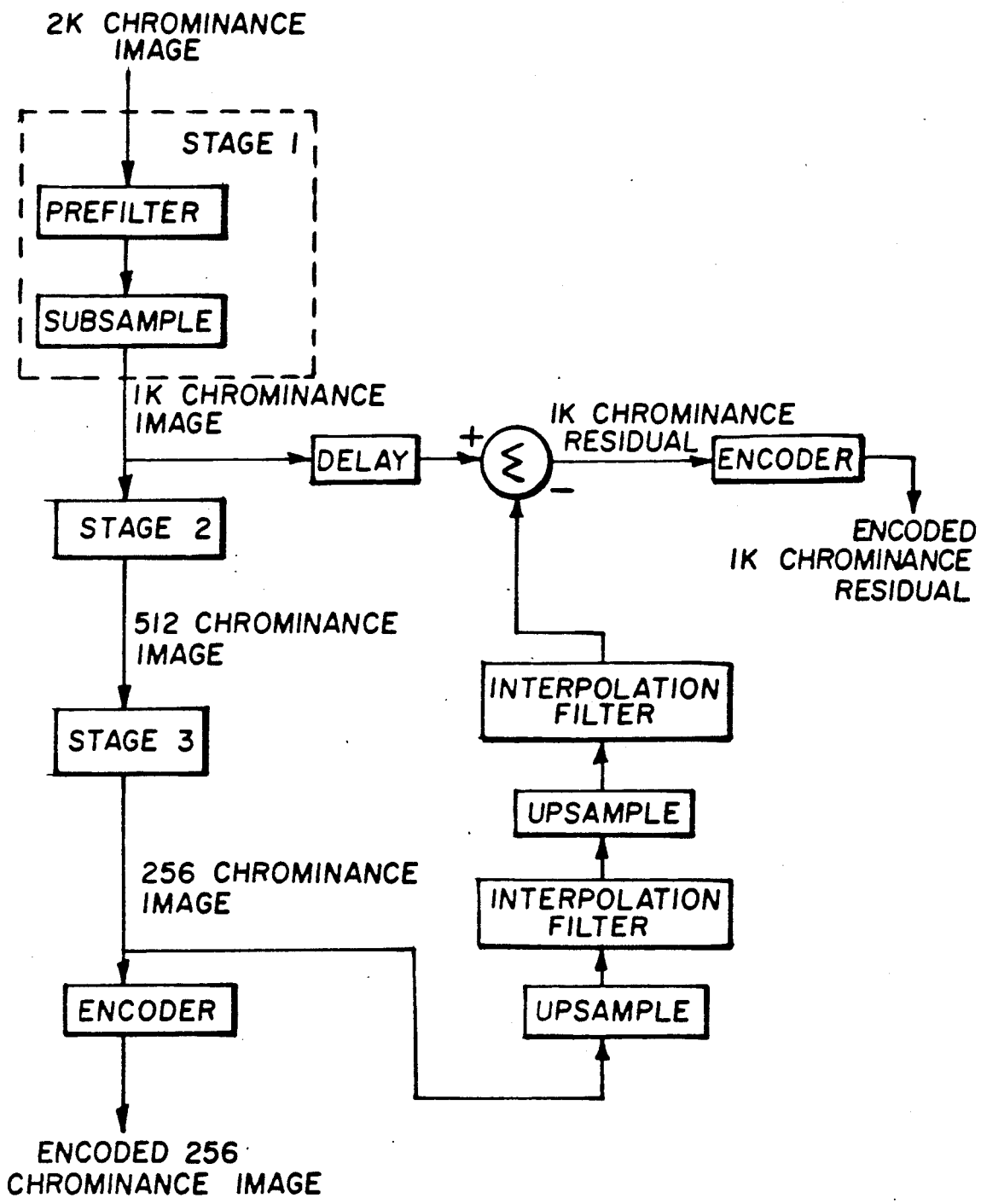
FIG. 16 is a block diagram illustrating the decomposition and encoder portion of a third preferred embodiment of the present invention for chrominance signals.
Figure 17:
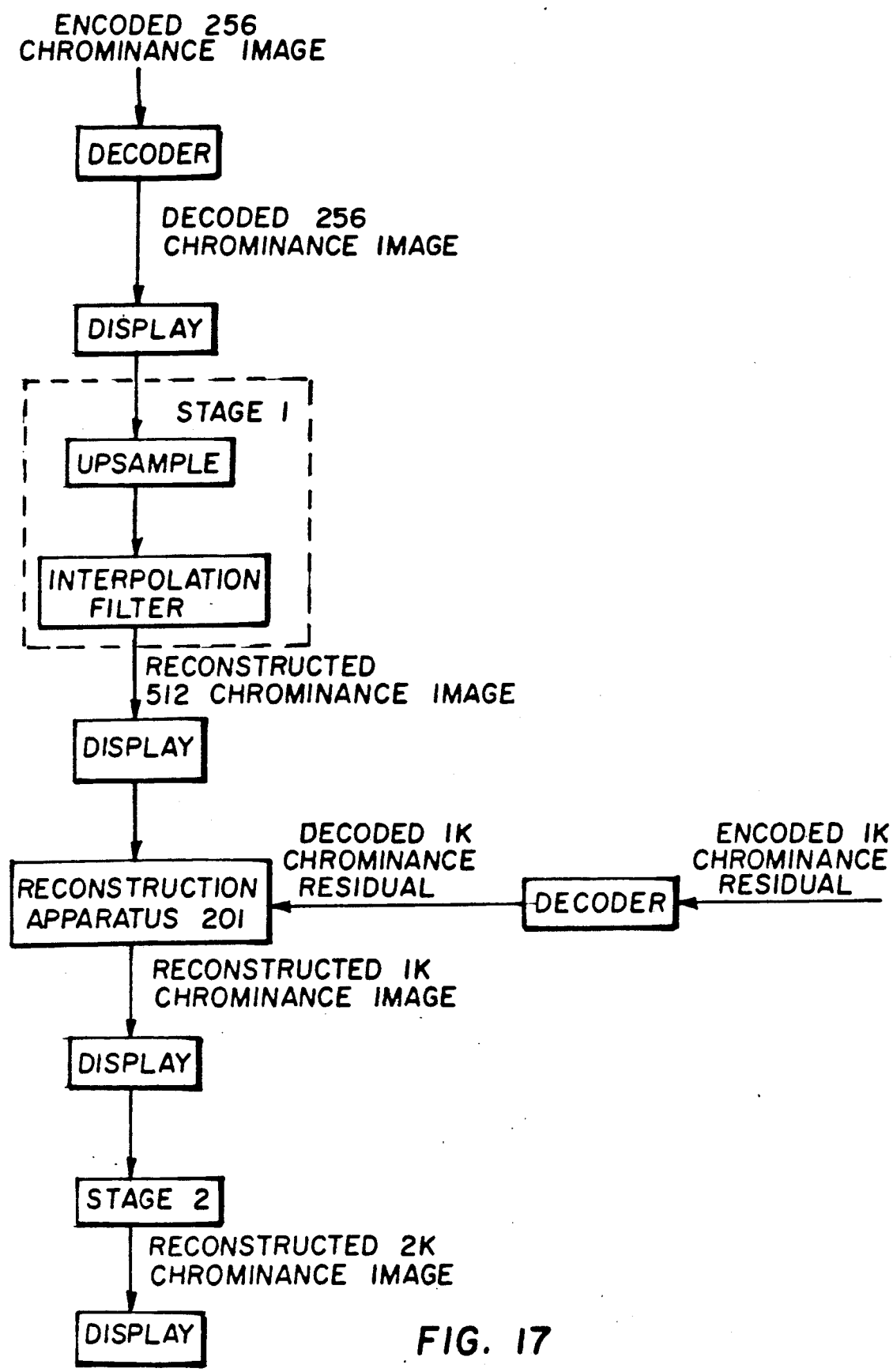
FIG. 17 is a block diagram illustrating the decoder and reconstruction portion of a third preferred embodiment of the present invention for chrominance signals.
Figure 18:
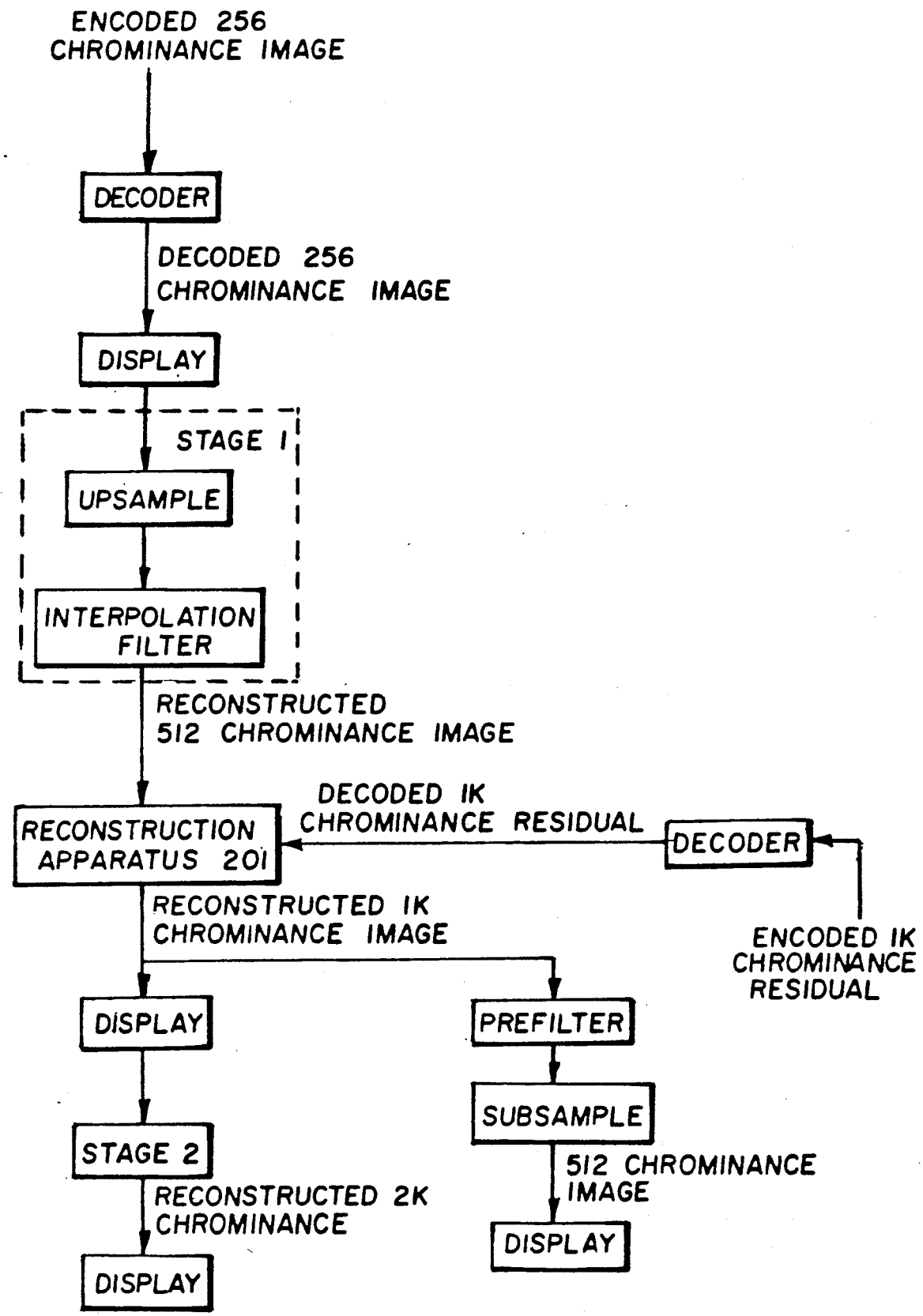
FIG. 18 is a block diagram illustrating an alternate method for the decoder and reconstruction portion of a third preferred embodiment of the present invention for chrominance signals.

In a third embodiment for chrominance signals, the apparatus of FIG. 16 is used for decomposition and encoding. The chrominance information to be stored consists of a 256 base image and a 1K residual. Images can be reconstructed using the apparatus of FIG. 17 or by using the apparatus of FIG. 18 where the 512 chrominance signal is generated by subsampling the reconstructed 1K chrominance signal. This method improves reconstructed quality at the 1K and 2K levels compared to the second embodiment.

Figure 19:
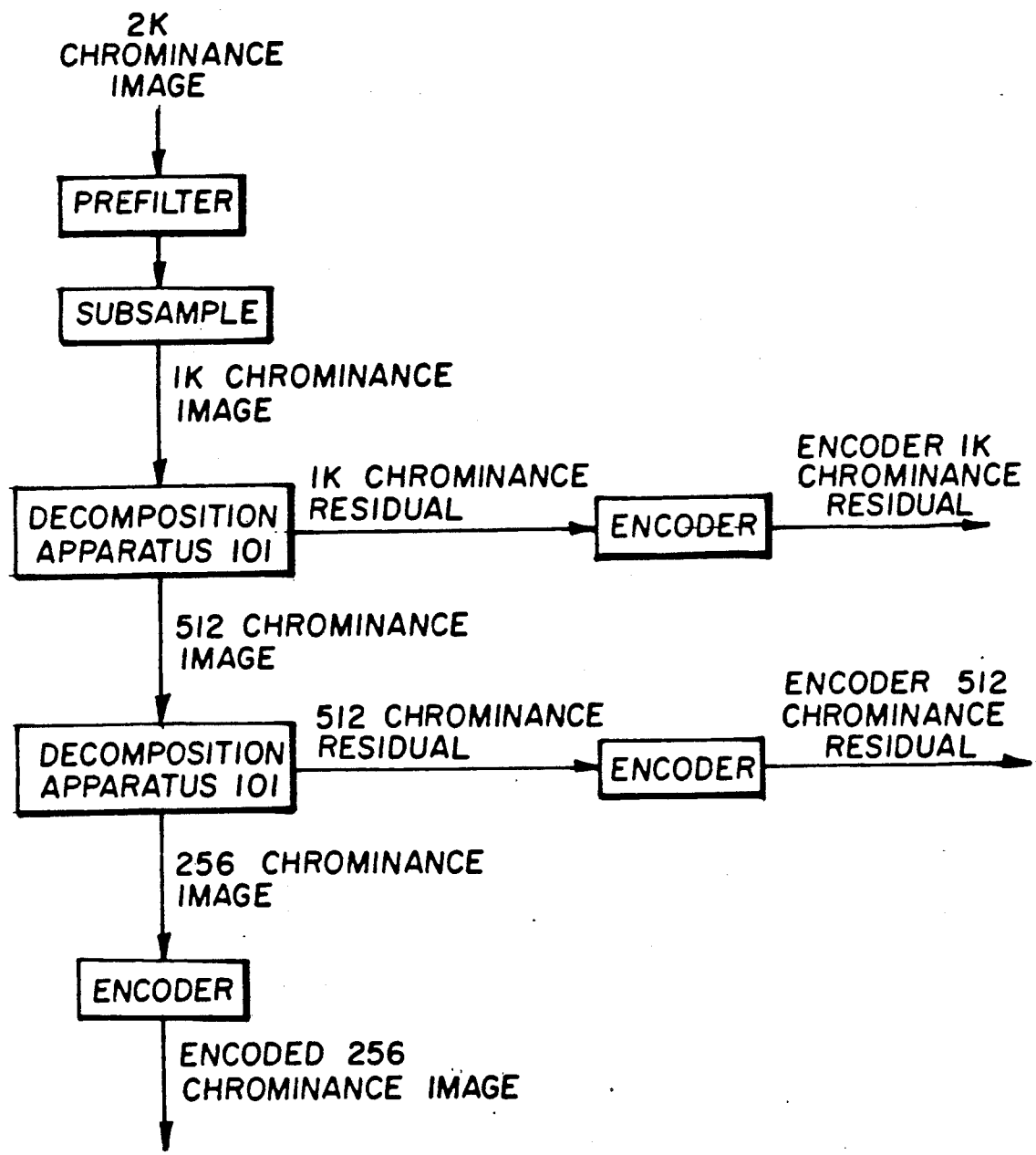
FIG. 19 is a block diagram illustrating the decomposition and encoder portion of a fourth preferred embodiment of the present invention for chrominance signals.
Figure 20:
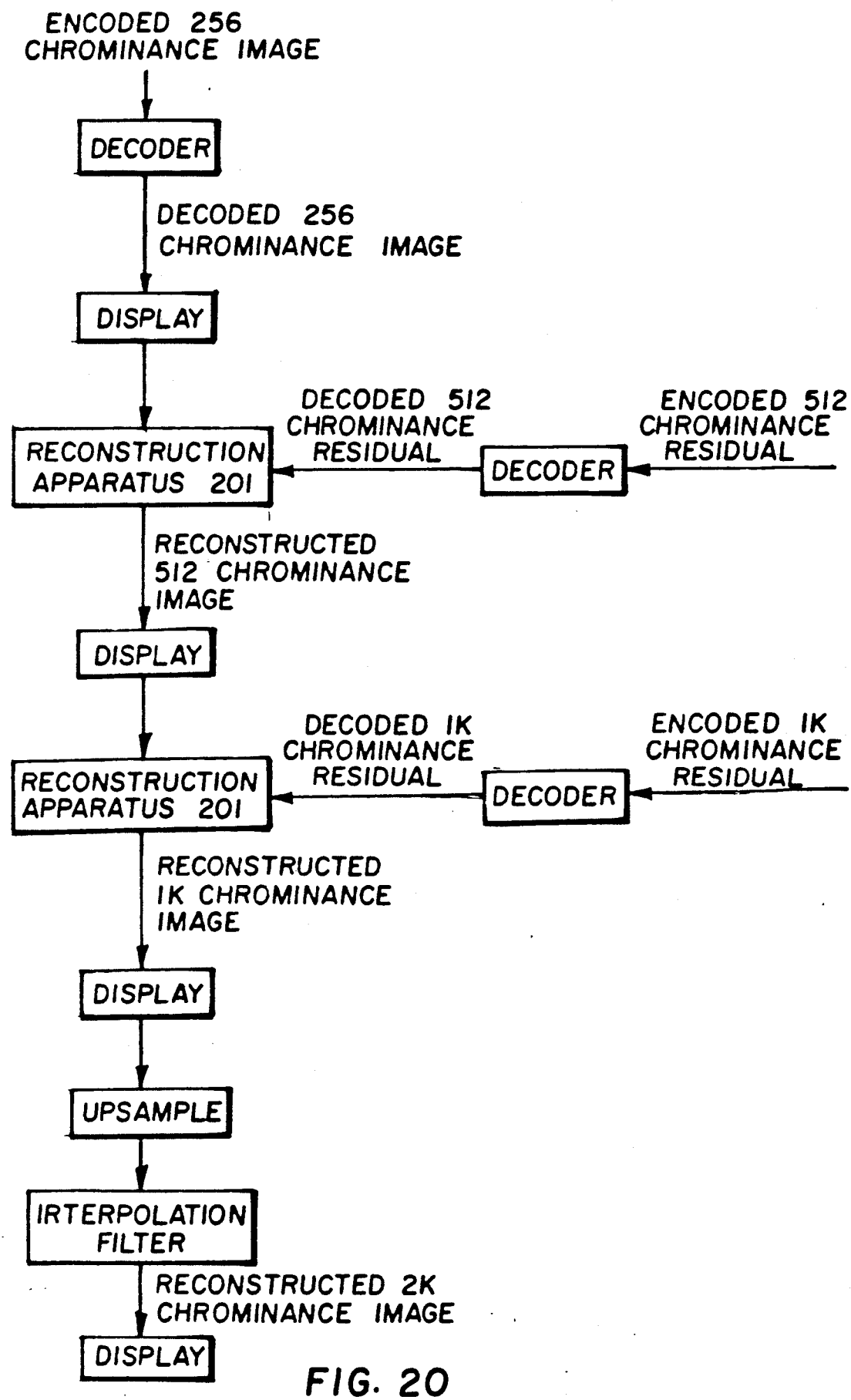
FIG. 20 is a block diagram illustrating the decoder and reconstruction portion of a fourth preferred embodiment of the present invention for chrominance signals.

In a fourth embodiment for chrominance signals, the apparatus of FIG. 19 is used for decomposition and encoding. The chrominance information to be stored consists of a 256 base image, a 512 residual image, and a 1K residual image. Images are reconstructed using the apparatus of FIG. 20. The advantage of this embodiment over the third embodiment is that it is not necessary to reconstruct the 1K image first before the 512 image can be computed (since the 512 image is reconstructed by adding a 512 residual to an interpolated 256 image.) The disadvantage is the additional storage required as compared to the third embodiment.

Figure 21:
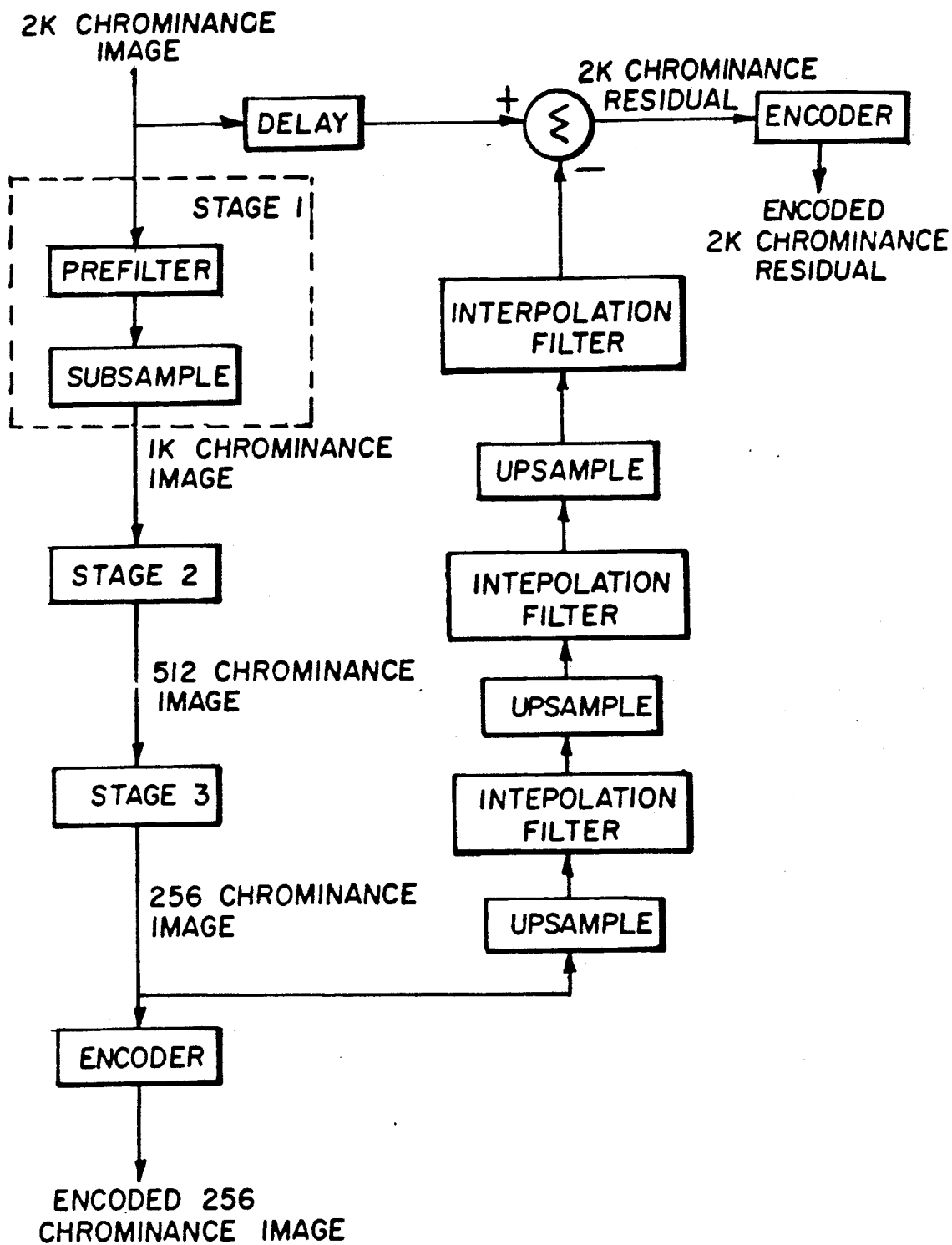
FIG. 21 is a block diagram illustrating the decomposition and encoder portion of a fifth preferred embodiment of the present invention for chrominance signals.
Figure 22:
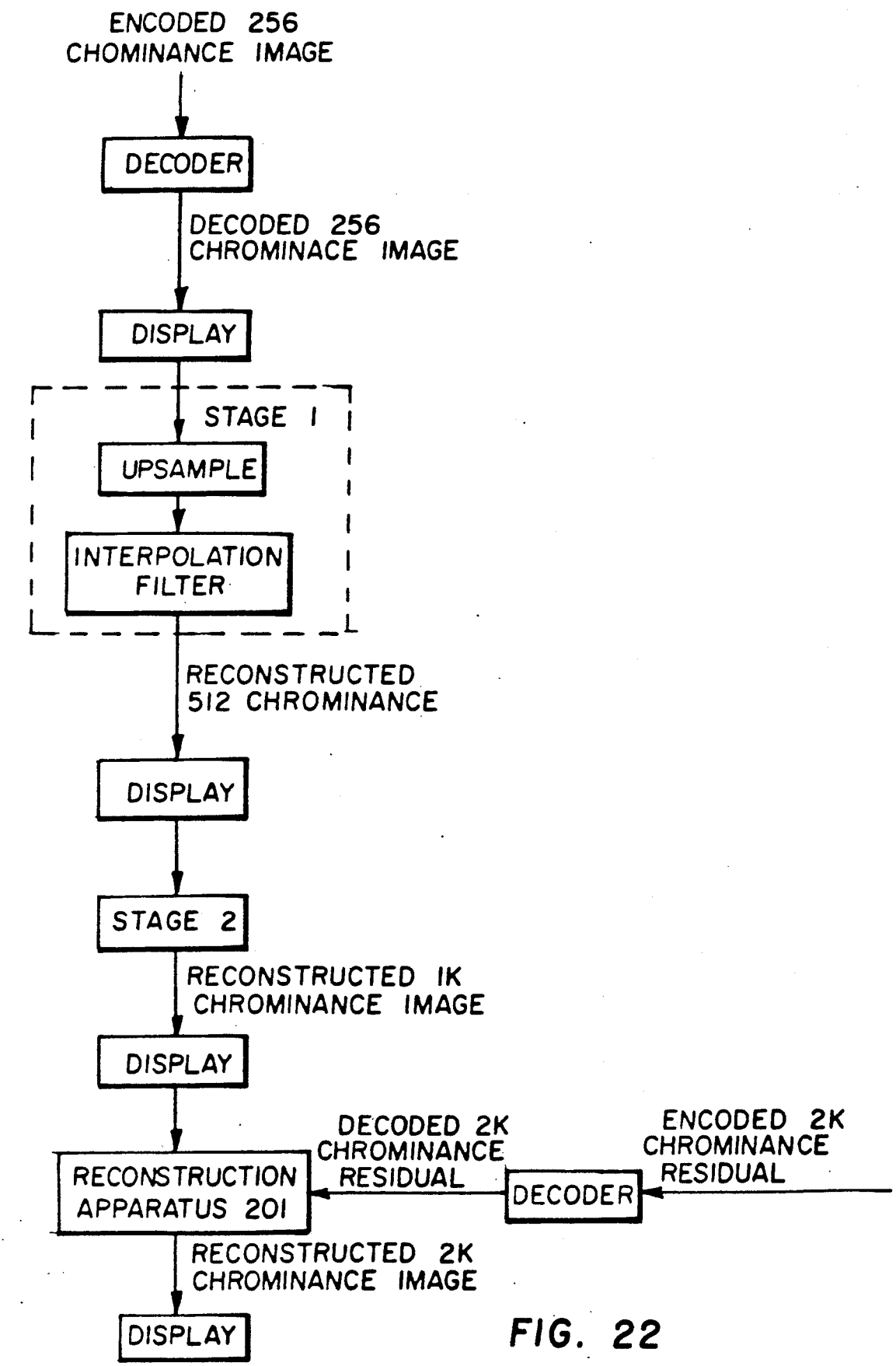
FIG. 22 is a block diagram illustrating the decoder and reconstruction portion of a fifth preferred embodiment of the present invention for chrominance signals.
Figure 23:
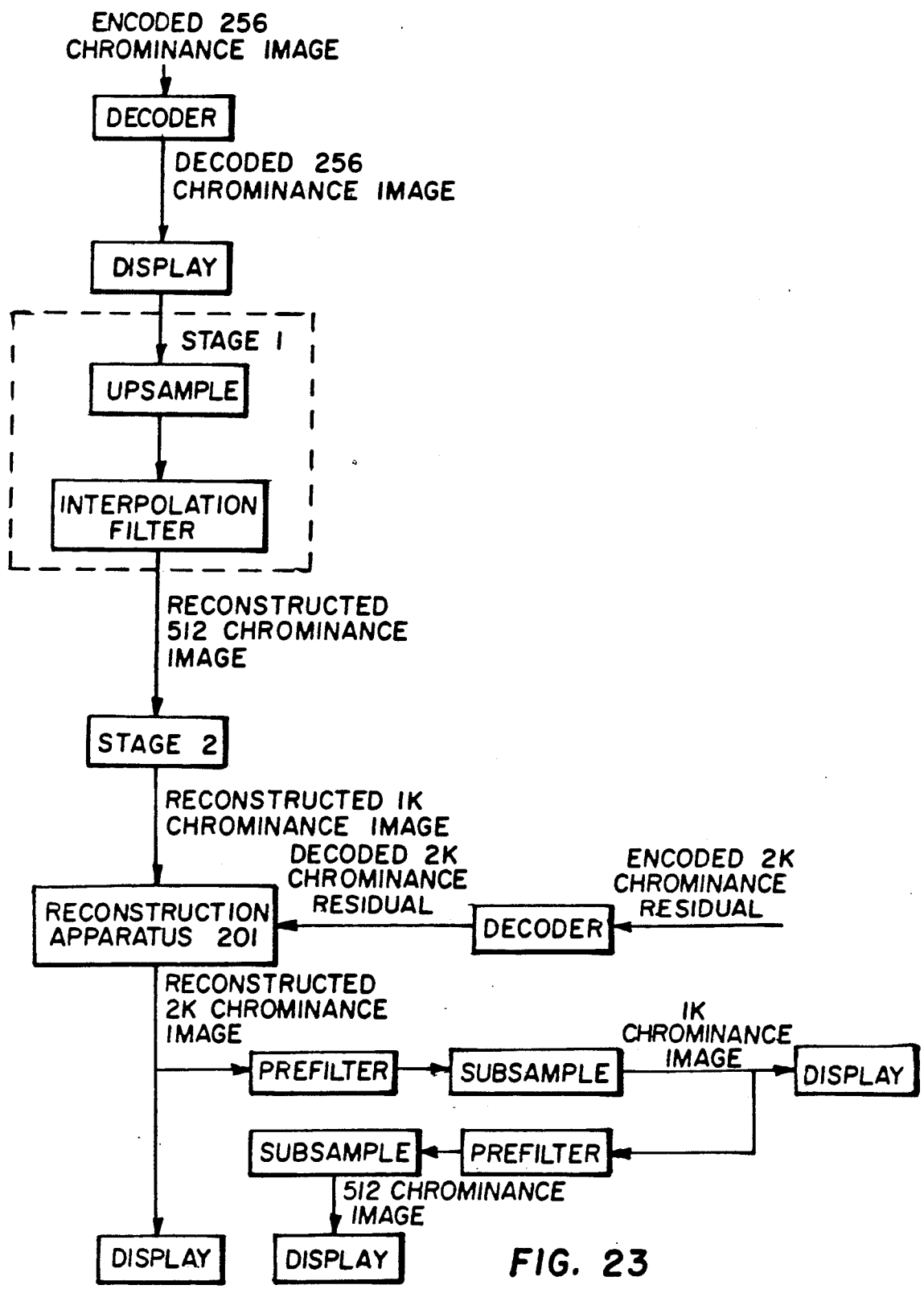
FIG. 23 is a block diagram illustrating an alternate method for the decoder and reconstruction portion of a fifth preferred embodiment of the present invention for chrominance signals.

In a fifth embodiment for chrominance signals, the apparatus of FIG. 21 is used for decomposition and encoding. The chrominance information to be stored consists of a 256 base image and a 2K residual. Images are reconstructed using the apparatus of FIG. 22 or by using the apparatus of FIG. 23 where the 512 and 1K chrominance signals are generated by subsampling the 2K reconstructed signal. This method provides very high quality at the 2K level compared to the other embodiments, and still provides good quality at the 512 and 1K levels since the chrominance signals at these levels can be generated from a higher resolution signal. Since residuals for the 512 and 1K levels are not stored, this approach provides some compression over a full residual pyramid approach.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A hierarchical storage method for color images comprising the steps of:
   (a) forming a digital representation of the image wherein each pixel in said representation is associated with three color values;
   (b) combining the three color values for each pixel using a color matrixing procedure to form a luminance image and two chrominance images;
   (c) decomposing said luminance image according to the following steps:
     1. lowpass filtering and subsampling said luminance image to form a lower resolution luminance image;
     2. interpolating said lower resolution luminance image to the dimensions of the higher resolution luminance image to form a prediction image;

3. subtracting said prediction image from the higher resolution luminance image to form a luminance residual image;
4. encoding and storing said luminance residual image;
5. creating a plurality of encoded and stored luminance residual images of different resolutions by iterating steps 1, 2, 3, and 4 where the input to the lowpass filtering and subsampling operation at each iteration is the lower resolution luminance image formed in the previous iteration; and
6. further decomposing the lowest resolution luminance image formed in step 5 into a plurality of lower resolution images according to the following steps:
   subsampling the even-numbered pixels on the even-numbered lines to create a first partitioned image;
   subsampling the odd-numbered pixels on the even-numbered lines to create a second partitioned image;
   subsampling the even-numbered pixels on the odd-numbered lines to create a third partitioned image; and
   subsampling the odd-numbered pixels on the odd-numbered lines to create a fourth partitioned image;
(d) encoding and storing said partitioned images;
(e) decomposing a first of said chrominance images according to the following steps:
   1. lowpass filtering and subsampling said chrominance image to form a lower resolution chrominance image; and
   2. iterating step 1 under the dimensions of said lower resolution chrominance image are equal to the dimensions of said partitioned images where the input to the lowpass filtering and subsampling operation at each iteration is the lower resolution chrominance image formed in the previous iteration;
(f) encoding and storing the lowest resolution chrominance image formed in (e); and
(g) repeating (e) and (f) for said second chrominance image to create, encode, and store a second lowest resolution chrominance image.

2. A hierarchical storage method according to claim 1 and further comprising the steps of:
(a) interpolating said first lowest resolution chrominance image to the dimensions of a corresponding higher resolution chrominance image to form a prediction image;
(b) subtracting said prediction image from said higher resolution chrominance image to form a chrominance residual image;
(c) encoding and storing said first chrominance residual image; and
(d) repeating (a), (b), and (c) for said second lowest resolution chrominance image to create, encode, and store a second chrominance residual image.

3. A hierarchical storage method according to claim 1 and further comprising the steps of:
(a) interpolating said first lowest resolution chrominance image to the dimensions of a corresponding higher resolution chrominance image to form a prediction image;
(b) subtracting said prediction image from said higher resolution chrominance image to form a chrominance residual image;
(c) creating a first set of chrominance residual images of different resolutions by iterating the following steps:
   applying (a) one or more times on the higher resolution chrominance image used in the previous iteration to form a prediction image; and
   applying (b) wherein said prediction image is subtracted from the higher resolution chrominance image of the same dimensions as said prediction image;
(d) encoding and storing said first set of chrominance residual images; and
(e) repeating (a), (b), (c) and (d) for said second lowest resolution chrominance image to create, encode, and store a second set of chrominance residual images.

4. A hierarchical display method according to claim 1 and further comprising the steps of:
retrieving and decoding one of said partitioned luminance images;
retrieving and decoding said first lowest resolution chrominance image;
retrieving and decoding said second lowest resolution chrominance image;
combining the luminance and chrominance values for each pixel using a color matrixing procedure to create three color values representing a color image; and displaying said color image.

5. A hierarchical display method according to claim 4 and further comprising the steps of:
retrieving and decoding at least one of the remainder of said partitioned luminance images;
combining all of said retrieved partitioned images to form a higher resolution luminance image;
forming a first higher resolution chrominance image by interpolating said first lowest resolution chrominance image to the dimensions of said higher resolution luminance image;
forming a second higher resolution chrominance image by interpolating said second lowest resolution chrominance image to the dimensions of said higher resolution luminance image;
combining the luminance and chrominance values for each pixel using a color matrixing procedure to create three color values representing a color image; and
displaying said color image.

6. A hierarchical display method according to claim 5 and further comprising the steps of:
retrieving and decoding the remainder of said partitioned luminance images;
combining all of said retrieved partitioned images to form a higher resolution luminance image;
combining the luminance and chrominance values for each pixel using a color matrixing procedure to create three color values representing a color image; and
displaying said color image.

7. A hierarchical display method according to claim 6 and further comprising the steps of:
interpolating said combined retrieved luminance image to the dimensions of the next higher resolution level to form a prediction image;
retrieving and decoding the luminance residual image corresponding to said next higher resolution level;

adding said residual image to said prediction image to form a higher resolution luminance image;
interpolating said first higher resolution chrominance image to the dimensions of said higher resolution luminance image;
combining the luminance and chrominance values for each pixel using a color matrixing procedure to create three color values representing a color image;
displaying said color image; and
iterating these steps for each remaining luminance residual image where the inputs to the interpolation operations are the higher resolution images formed in the previous iteration.

8. A hierarchical display method according to claim 2 and further comprising the steps of:
retrieving and decoding one of said partitioned luminance images;
retrieving and decoding said first lowest resolution chrominance image;
retrieving and decoding said second lowest resolution chrominance image;
combining the luminance and chrominance values for each pixel using a color matrixing procedure to create three color values representing a color image; and
displaying said color image.

9. A hierarchical display method according to claim 8 and further comprising the steps of:
(a) retrieving and decoding at least one of the remainder of said partitioned luminance images;
(b) combining all of said retrieved partitioned images to form a higher resolution luminance image;
(c) forming a first higher resolution chrominance image by the following steps:
interpolating said first lowest resolution chrominance image to the dimensions of said higher resolution luminance image; and
retrieving and decoding said first chrominance residual image if the dimensions of said chrominance residual image are equal to the dimensions of said higher resolution luminance image and combining said chrominance residual image with said interpolated chrominance image;
(d) forming a second lowest resolution chrominance image by repeating (c) for said second lowest resolution chrominance image;
(e) combining the luminance and chrominance values for each pixel using a color matrixing procedure to create three color values representing a color image; and
(f) displaying said color image.

10. A hierarchical display method according to claim 9 and further comprising the steps of:
retrieving and decoding the remainder of said partitioned luminance images;
combining all of said retrieved partitioned images to form a higher resolution luminance image;
combining the luminance and chrominance values for each pixel using a color matrixing procedure to create three color values representing a color image; and
displaying said color image.

11. A hierarchical display method according to claim 10 and further comprising the steps of:
(a) interpolating said combined retrieved luminance image to the dimensions of the next higher resolution level to form a prediction image;
(b) retrieving and decoding the luminance residual image corresponding to said next higher resolution level;
(c) adding said residual image to said prediction image to form a higher resolution luminance image;
(d) forming a first higher resolution chrominance image by the following steps:
interpolating said first lowest resolution chrominance image to the dimensions of said higher resolution luminance image; and
retrieving and decoding said first chrominance residual image if the dimensions of said chrominance residual image are equal to the dimensions of said higher resolution luminance image and combining said chrominance residual image with said interpolated chrominance image;
(e) forming a second higher resolution chrominance image by repeating (d) for said second lowest resolution chrominance image;
(f) combining the luminance and chrominance values for each pixel using a color matrixing procedure to create three color values representing a color image;
(g) displaying said color image; and
(h) iterating these steps for each remaining luminance residual image.

12. A hierarchical display method according to claim 3 and further comprising the steps of:
retrieving and decoding one of said partitioned luminance images;
retrieving and decoding the lowest resolution image formed from said first chrominance image;
retrieving and decoding the lowest resolution image formed from said second chrominance image;
combining the luminance and chrominance values for each pixel using a color matrixing procedure to create three color values representing a color image; and
displaying said color image.

13. A hierarchical display method according to claim 12 and further comprising the steps of:
(a) retrieving and decoding at least one of the remainder of said partitioned luminance images;
(b) combining all of said retrieved partitioned images to form a higher resolution luminance image;
(c) forming a first higher resolution chrominance image by the following steps:
interpolating said first lowest resolution chrominance image to the dimensions of said higher resolution luminance image; and
retrieving and decoding one chrominance residual image from said first set of chrominance residual images if the dimensions of said chrominance residual image are equal to the dimensions of said higher resolution luminance image and combining said chrominance residual image with said interpolated chrominance image;
(d) forming a second higher resolution chrominance image by repeating (c) for said lowest resolution chrominance image;
(e) combining the luminance and chrominance values for each pixel using a color matrixing procedure to create three color values representing a color image; and
(f) displaying said color image.

14. A hierarchical display method according to claim 13 and further comprising the steps of:

retrieving and decoding the remainder of said partitioned luminance images;

combining all of said retrieved partitioned images to form a higher resolution luminance image;

combining the luminance and chrominance values for each pixel using a color matrixing procedure to create three color values representing a color image; and displaying said color image.

15. A hierarchical display method according to claim 14 and further comprising the steps of:

(a) interpolating said combined retrieved luminance image to the dimensions of the next higher resolution level to form a prediction image;

(b) retrieving and decoding the luminance residual image corresponding to said next higher resolution level;

(c) adding said residual image to said prediction image to form a higher resolution luminance image;

(d) forming a first higher resolution chrominance image by the following steps:

interpolating said first lowest resolution chrominance image to the dimensions of said higher resolution luminance image; and retrieving and decoding one chrominance residual image from said first set of chrominance residual images if the dimensions of said chrominance residual image are equal to the dimensions of said higher resolution luminance image and combining said chrominance residual image with said interpolating chrominance image;

(e) forming a second higher resolution chrominance image by repeating (d) for said second lowest resolution chrominance image;

(f) combining the luminance and chrominance values for each pixel using a color matrixing procedure to create three color values representing a color image;

(g) displaying said color image; and (h) iterating these steps for each remaining luminance residual image.

16. A hierarchical storage method for color images comprising the steps of:

(a) forming a digital representation of the image wherein each pixel in said representation is associated with three color values;

(b) combining the three color values for each pixel using a color matrixing procedure to form a luminance image and two chrominance images;

(c) decomposing said luminance image according to the following steps:

1. lowpass filtering and subsampling said luminance image to form a lower resolution luminance image;

2. interpolating said lower resolution luminance image to the dimensions of the higher resolution luminance image to form a prediction image;

3. subtracting said prediction image from the higher resolution luminance image to form a luminance residual image;

4. encoding and storing said luminance residual image; and 5. creating a plurality of encoded and stored luminance residual images of different resolutions by iterating steps 1, 2, 3, and 4 where the input to the lowpass filtering and subsampling operation at each iteration is the lower resolution luminance image formed in the previous iteration;

(d) encoding and storing the lowest resolution luminance image formed in (c);

(e) further decomposing said lowest resolution luminance image into a plurality of lower resolution luminance base images by iteratively lowpass filtering and subsampling said image to create one or more lower resolution images;

(f) encoding and storing said lower resolution base images;

(g) decomposing a first of said chrominance images according to the following steps:

1. lowpass filtering and subsampling said chrominance image to form a lower resolution chrominance image; and 2. iterating step 1 until the dimensions of said lower resolution chrominance image are equal to the dimensions of the lowest resolution luminance image where the input to the lowpass filtering and subsampling operation at each iteration is the lower resolution chrominance image formed in the previous iteration;

(h) encoding and storing the lowest resolution chrominance image formed in (g); and (i) repeating (g) and (h) for said second chrominance image to create, encode, and store a second lowest resolution chrominance image.

17. A hierarchical storage method according to claim 16 and further comprising the steps of:

(a) interpolating said first lowest resolution chrominance image to the dimensions of a corresponding higher resolution chrominance image to form a prediction image;

(b) subtracting said prediction image from said higher resolution chrominance image to form a chrominance residual image;

(c) encoding and storing said first chrominance residual image; and (d) repeating (a), (b), and (c) for said second lowest resolution chrominance image to create, encode, and store a second chrominance residual image.

18. A hierarchical storage method according to claim 16 and further comprising the steps of:

(a) interpolating said first lowest resolution chrominance image to the dimensions of a corresponding higher resolution chrominance image to form a prediction image;

(b) subtracting said prediction image from said higher resolution chrominance image to form a chrominance residual image;

(c) creating a first set of chrominance residual images of different resolutions by iterating the following steps:

applying (a) one or more times on the higher resolution chrominance image used in the previous iteration to form a prediction image; and applying (b) wherein said prediction image is subtracted from the higher resolution chrominance image of the same dimensions as said prediction image;

(d) encoding and storing said first set of chrominance residual images; and (e) repeating (a), (b), (c) and (d) for said second lowest resolution chrominance image to create, encode, and store a second set of chrominance residual images.

19. A hierarchical display method according to claim 16 and further comprising the steps of:

retrieving and decoding said lowest resolution luminance base image;
retrieving and decoding said first lowest resolution chrominance image;
retrieving and decoding said second lowest resolution chrominance image;
combining the luminance and chrominance values for each pixel using a color matrixing procedure to crate three color values representing a color image; and displaying said color image.

20. A hierarchical display method according to claim 19 and further comprising the steps of:
retrieving and decoding the next higher resolution luminance base image;
forming a first higher resolution chrominance image by interpolating said first lowest resolution chrominance image to the dimensions of said higher luminance resolution base image;
forming a second higher resolution chrominance image by interpolating said second lowest resolution chrominance image to the dimensions of said higher resolution luminance base image;
combining the luminance and chrominance values for each pixel using a color matrixing procedure to create three color values representing a color image;
displaying said color image; and
iterating these steps for the remaining luminance base images and said lowest resolution luminance image.

21. A hierarchical display method according to claim 20 and further comprising the steps of:
interpolating said lowest resolution luminance image to the dimensions of the next higher resolution level to form a prediction image;
retrieving and decoding the luminance residual image corresponding to said next higher resolution level;
adding said residual image to said prediction image to form a higher resolution luminance image;
interpolating said first higher resolution chrominance image to the dimensions of said higher resolution luminance image;
interpolating said second higher resolution chrominance image to the dimensions of said higher resolution luminance image;
combining the luminance and chrominance values for each pixel using a color matrixing procedure to create three color values representing a color image;
displaying said color image; and
iterating these steps for each remaining luminance residual image.

22. A hierarchical display method according to claim 17 and further comprising the steps of:
retrieving and decoding said lowest resolution luminance image;
retrieving and decoding said first lowest resolution chrominance image;
retrieving and decoding said second lowest resolution chrominance image;
combining the luminance and chrominance values for each pixel using a color matrixing procedure to create three color values representing a color image; and displaying said color image.

23. A hierarchical display method according to claim 22 and further comprising the steps of:
(a) retrieving and decoding the next higher resolution luminance base image;
(b) forming a first higher resolution chrominance image by the following steps:
interpolating said first lowest resolution chrominance image to the dimensions of said higher resolution luminance base image; and
retrieving and decoding said first chrominance residual image if the dimensions of said chrominance residual image are equal to the dimensions of said higher resolution luminance base image and combining said chrominance residual image with said interpolated chrominance image;
(c) forming a second higher resolution chrominance image by repeating (b) for said second lowest resolution chrominance image;
(d) combining the luminance and chrominance values for each pixel using a color matrixing procedure to crate three color values representing a color image;
(e) displaying said color image; and
(f) iterating these steps for the remaining luminance base images and said lowest resolution luminance image.

24. A hierarchical display method according to claim 23 and further comprising the steps of:
(a) interpolating said lowest resolution luminance image to the dimensions of the next higher resolution level to form a prediction image;
(b) retrieving and decoding the luminance residual image corresponding to said next higher resolution level;
(c) adding said residual image to said prediction image to form a higher resolution luminance image;
(d) forming a first higher resolution chrominance image by the following steps:
interpolating said first lowest resolution chrominance image to the dimensions of said higher resolution luminance image; and
retrieving and decoding said first chrominance residual image if the dimensions of said chrominance residual image are equal to the dimensions of said higher resolution luminance image and combining said chrominance residual image with said interpolated chrominance image;
(e) forming a second higher resolution chrominance image by repeating (d) for said second lowest resolution chrominance image;
(f) combining the luminance and chrominance values for each pixel using a color matrixing procedure to create three color values representing a color image;
(g) displaying said color image; and
(h) iterating these steps for each remaining luminance residual image.

25. A hierarchical display method according to claim 18 and further comprising the steps of:
retrieving and decoding said lowest resolution luminance base image;
retrieving and decoding said first lowest resolution chrominance image;
retrieving and decoding said second lowest resolution chrominance image;
combining the luminance and chrominance values for each pixel using a color matrixing procedure to create three color values representing a color image; and displaying said color image.

26. A hierarchical display method according to claim 25 and further comprising the steps of:
(a) retrieving and decoding the next higher resolution luminance base image;

(b) forming a first higher resolution chrominance image by the following steps:
   interpolating said first lowest resolution chrominance image to the dimensions of said higher resolution luminance base image; and
   retrieving and decoding one chrominance residual image from said first set of chrominance residual images if the dimensions of said chrominance residual image are equal to the dimensions of said higher resolution luminance base image and combining said chrominance residual image with said interpolated chrominance image;
(c) forming a second higher resolution chrominance image by repeating (b) for said second lowest resolution chrominance image;
(d) combining the luminance and chrominance values for each pixel using a color matrixing procedure to create three color values representing a color image;
(e) displaying said color image; and
(f) iterating these steps for the remaining luminance base images and said lowest resolution luminance image.

27. A hierarchical display method according to claim 26 and further comprising the steps of:
(a) interpolating said lowest resolution luminance image to the dimensions of the next higher resolution level to form a prediction image;
(b) retrieving and decoding the luminance residual image corresponding to said next higher resolution level;
(c) adding said residual image to said prediction image to form a higher resolution luminance image;
(d) forming a first higher resolution chrominance image by the following steps:
   interpolating said first lowest resolution chrominance image to the dimensions of said higher resolution luminance image; and
   retrieving and decoding one chrominance residual image from said first set of chrominance residual images if the dimensions of said chrominance residual image are equal to the dimensions of said higher resolution luminance image and combining said chrominance residual image with said interpolated chrominance image;
(e) forming a second higher resolution chrominance image by repeating (d) for said second lowest resolution chrominance image;
(f) combining the luminance and chrominance values for each pixel using a color matrixing procedure to create three color values representing a color image;
(g) displaying said color image; and
(h) iterating there steps for each remaining luminance residual image.

* * * * *